(12) United States Patent
Liu

(10) Patent No.: US 12,556,934 B2
(45) Date of Patent: Feb. 17, 2026

(54) DATA COMMUNICATION METHOD AND APPARATUS

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 356 days.

(21) Appl. No.: 18/032,968

(22) PCT Filed: Oct. 22, 2020

(86) PCT No.: PCT/CN2020/122974
§ 371 (c)(1),
(2) Date: Apr. 20, 2023

(87) PCT Pub. No.: WO2022/082653
PCT Pub. Date: Apr. 28, 2022

(65) Prior Publication Data
US 2023/0397015 A1    Dec. 7, 2023

(51) Int. Cl.
*H04W 16/28*       (2009.01)
*H04W 72/1268*   (2023.01)
*H04W 72/232*     (2023.01)

(52) U.S. Cl.
CPC ....... *H04W 16/28* (2013.01); *H04W 72/1268* (2013.01); *H04W 72/232* (2023.01)

(58) Field of Classification Search
CPC ........................... H04W 16/28; H04W 72/232; H04W 72/1268
See application file for complete search history.

(56) References Cited

U.S. PATENT DOCUMENTS

2019/0222279 A1    7/2019  Xi et al.
2020/0344729 A1*  10/2020  Park ...................... H04L 5/0053

FOREIGN PATENT DOCUMENTS

| CN | 111277391 A | 6/2020 |
| CN | 111416695 A | 7/2020 |
| EP | 3651397 A1 | 5/2020 |

OTHER PUBLICATIONS

PCT/CN2020/122974, English translation of Search Report dated Jul. 22, 2021, 2 pages.

(Continued)

*Primary Examiner* — Ayaz R Sheikh
(74) *Attorney, Agent, or Firm* — Cozen O'Connor

(57) ABSTRACT

A data communication method includes: acquiring a control signaling sent by a base station; wherein the control signaling carries indication information of at least one of a transmission and reception point TRP operation mode or a beam mapping scheme, the TRP operation mode is a single-TRP-based communication or a multi-TRP-based communication, and the beam mapping scheme comprises at least one of information of a time unit or information of a mapping pattern between multiple uplink cooperative transmitting beams corresponding to multiple TRPs and time units; and sending data to the base station in the TRP operation mode, the beam mapping scheme, or the TRP operation mode and the beam mapping scheme.

20 Claims, 7 Drawing Sheets

(56) References Cited

OTHER PUBLICATIONS

European Patent Application No. 20958235.2, Search and Opinion dated Nov. 9, 2023, 10 pages.
Nokia et al. "On beam grouping and reporting" 3GPP TSG RAN WG1 Meeting #88bis R1-1705959, Apr. 2017, 12 pages.
Chinese Patent Application No. 202080002902.2, Office Action with English translation dated Feb. 28, 2025, 26 pages.

* cited by examiner

DATA COMMUNICATION METHOD AND APPARATUS

CROSS-REFERENCE TO RELATED APPLICATIONS

This application is a U.S. national phase application of International Application No. PCT/CN2020/122974, filed Oct. 22, 2020, the entire contents of which are incorporated herein by reference.

TECHNICAL FIELD

The present disclosure generally relates to the field of mobile communication, and more particularly, to a data communication method and apparatus.

BACKGROUND

In mobile communication in a high-frequency band, as the wavelength decreases, the blocking effect of obstacles such as human bodies or vehicles becomes more serious. Therefore, as the frequency band of electromagnetic waves used in the mobile communication continues to increases, in order to ensure network coverage, it is necessary to adjust the original single transmission and reception point (TRP)-based communication to multi-TRP-based communication for the mobile communication, so as to use the cooperation among multiple TRPs to perform communication from multi-angle beams corresponding to the multiple TRPs, thereby reducing the adverse impact of blocking effect.

SUMMARY

According to a first aspect of embodiments of the present disclosure, there is provided a data communication method, which is applied to a user equipment (UE) and includes: acquiring a control signaling sent by a base station; in which the control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units; and sending data to the base station in the TRP operation mode and/or the beam mapping scheme.

According to a second aspect of embodiments of the present disclosure, there is provided a data communication method, which is applied to a base station and includes: sending a control signaling to a user equipment UE; in which the control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units; and receiving data sent by the UE in the TRP operation mode and/or the beam mapping scheme.

According to a third aspect of embodiments of the present disclosure, there is provided a communication device, which includes: a processor; a transceiver; a memory; and a computer program stored on the memory. The processor is configured to run the computer program to implement the data communication method as described in the first aspect of embodiments of the present disclosure.

According to a fourth aspect of embodiments of the present disclosure, there is provided a communication device, which includes: a processor; a transceiver; a memory; and a computer program stored on the memory. The processor is configured to run the computer program to implement the data communication method as described in the second aspect of embodiments of the present disclosure.

According to a fifth aspect of embodiments of the present disclosure, there is provided a processor-readable storage medium having stored therein a computer program, and the computer program is configured to cause a processor to execute the data communication method as described in the first aspect of embodiments of the present disclosure, or the data communication method as described in the second aspect of embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and other aspects and advantages of embodiments of the present disclosure will become apparent and more readily appreciated from the following descriptions on embodiments made with reference to the drawings, in which.

DETAILED DESCRIPTION

Figure 1:
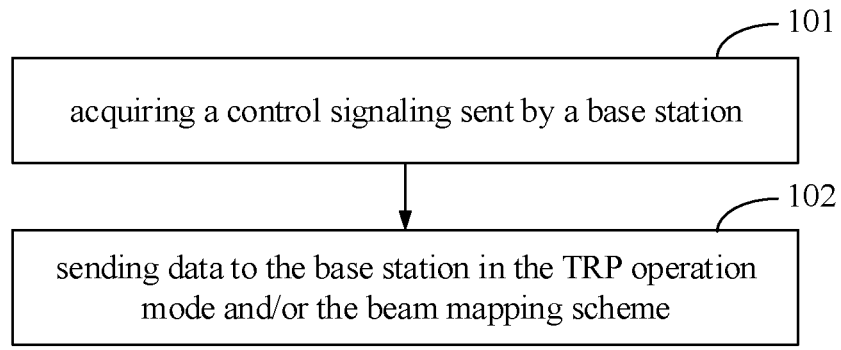
FIG. 1 is a schematic flowchart of a data communication method provided in embodiments of the present disclosure.

Embodiments of the present disclosure will be described in detail below, examples of which are illustrated in the accompanying drawings, in which same or similar elements and the elements having same or similar functions are denoted by like reference numerals throughout the descriptions. The embodiments described below with reference to the accompanying drawings are illustrative, and are intended to explain the present disclosure and should not be construed as limiting the present invention.

In the related art, in terms of multi-TRP-based communication or inter-panel cooperation, application is only made in a physical downlink shared channel (PDSCH), so the scope of application is limited.

To address this problem, embodiments of the present disclosure provide a data communication method and apparatus.

According to a first aspect of embodiments of the present disclosure, there is provided a data communication method, which is applied to a user equipment (UE) and includes: acquiring a control signaling sent by a base station; in which the control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units; and sending data to the base station in the TRP operation mode and/or the beam mapping scheme.

In some embodiments, acquiring the control signaling sent by the base station includes: receiving first group downlink control information DCI sent by the base station in a physical downlink control channel (PDCCH). The first group DCI carries the indication information of the TRP operation mode.

In some embodiments, after receiving the first group downlink control information DCI sent by the base station in the physical downlink control channel PDCCH, the method further includes: receiving first specific DCI for the UE sent by the base station in the PDCCH; and decoding the first specific DCI according to a decoding strategy corresponding to the TRP operation mode in the first group DCI to obtain the indication information of the beam mapping scheme.

In some embodiments, before sending the data to the base station in the TRP operation mode and/or the beam mapping scheme, the method further includes: configuring a beam mapping scheme corresponding to the indication information according to a higher-layer signaling sent by the base station; or predefining a beam mapping scheme corresponding to the indication information for the UE.

In some embodiments, acquiring the control signaling sent by the base station includes: receiving second group DCI sent by the base station in a PDCCH, in which the second group DCI carries the indication information of the beam mapping scheme; and determining a corresponding TRP operation mode according to the indication information of the beam mapping scheme carried in the second group DCI.

In some embodiments, acquiring the control signaling sent by the base station includes: receiving a second specific message for the UE sent by the base station in a PDCCH. The second specific message carries the indication information of the beam mapping scheme and/or the indication information of the TRP operation mode.

In some embodiments, the second specific DCI carries the indication information of the TRP operation mode, and before sending the data to the base station in the TRP operation mode and/or the beam mapping scheme, the method further includes: configuring a beam mapping scheme corresponding to the indication information according to a higher-layer signaling sent by the base station; or predefining a beam mapping scheme corresponding to the indication information for the UE.

In some embodiments, the indication information of the beam mapping scheme carried in the control signaling indicates a combination of the mapping pattern and the time unit selected by the base station, or indicates that the base station has not selected a beam mapping scheme.

In some embodiments, the indication information of the beam mapping scheme carried in the control signaling indicates one of the mapping pattern and the time unit. Before sending the data to the base station in the TRP operation mode and/or the beam mapping scheme, the method further includes: configuring the other one of the mapping pattern and the time unit according to a higher-layer signaling sent by the base station.

In some embodiments, before sending the data to the base station in the TRP operation mode and/or the beam mapping scheme, the method further includes: decoding specific DCI for the UE sent by the base station using a decoding strategy corresponding to the TRP operation mode to obtain data scheduling information used by a physical uplink shared channel (PUSCH). The PUSCH is used for sending the data to the base station, and the data scheduling information includes data sending information based on codebook transmission or data sending information based on non-codebook transmission.

According to a second aspect of embodiments of the present disclosure, there is provided a data communication method, which is applied to a base station and includes: sending a control signaling to a user equipment UE; in which the control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units; and receiving data sent by the UE in the TRP operation mode and/or the beam mapping scheme.

In some embodiments, sending the control signaling to the user equipment UE includes: sending first group downlink control information DCI to the UE in a physical downlink control channel PDCCH. The first group DCI carries the indication information of the TRP operation mode.

In some embodiments, after sending the control signaling to the user equipment UE, the method further includes: sending to the UE first specific DCI for the UE. The first specific DCI is configured to be decoded using a decoding strategy corresponding to the TRP operation mode in the first group DCI and carries the indication information of the beam mapping scheme.

In some embodiments, before receiving the data sent by the UE in the TRP operation mode and/or the beam mapping scheme, the method further includes: sending to the UE a higher-layer signaling for configuring a beam mapping scheme corresponding to the indication information.

In some embodiments, sending the control signaling to the user equipment UE includes: sending second group DCI to the UE in a PDCCH. The second group DCI carries the indication information of the beam mapping scheme, and the indication information of the beam mapping scheme corresponds to the TRP operation mode.

In some embodiments, sending the control signaling to the user equipment UE includes: sending to the UE second specific DCI for the UE in a PDCCH. The second specific DCI carries the indication information of the beam mapping scheme and/or the indication information of the TRP operation mode.

In some embodiments, the second specific DCI carries the indication information of the TRP operation mode, and before receiving the data sent by the UE in the TRP operation mode and/or the beam mapping scheme, the method further includes: sending to the UE a higher-layer signaling for configuring a beam mapping scheme corresponding to the indication information.

In some embodiments, the indication information of the beam mapping scheme carried in the control signaling indicates a combination of the mapping pattern and the time unit selected by the base station, or indicates that the base station has not selected a beam mapping scheme.

In some embodiments, the indication information of the beam mapping scheme carried in the control signaling indicates one of the mapping pattern and the time unit. Before receiving the data sent by the UE in the TRP operation mode and/or the beam mapping scheme, the method further includes: sending to the UE a higher-layer signaling for configuring the other one of the mapping pattern and the time unit.

In some embodiments, before sending the control signaling to the user equipment UE, the method further includes: scheduling according to a channel state CSI measurement value to determine at least one of the TRP operation mode or the beam mapping scheme; and/or performing beam management to determine at least one of the TRP operation mode or the beam mapping scheme.

According to a third aspect of embodiments of the present disclosure, there is provided a data communication apparatus, which is applied to a UE and includes an acquiring module and a transmission module. The acquiring module is configured to acquire a control signaling sent by a base station. The control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units. The transmission module is configured to send data to the base station in the TRP operation mode and/or the beam mapping scheme.

In some embodiments, the acquiring module includes a first receiving unit, and the first receiving unit is configured to receive first group downlink control information DCI sent by the base station in a physical downlink control channel PDCCH. The first group DCI carries the indication information of the TRP operation mode.

In some embodiments, the acquiring module further includes a second receiving unit and a decoding unit. The second receiving unit is configured to receive first specific DCI for the UE sent by the base station in the PDCCH; and the decoding unit is configured to decode the first specific DCI according to a decoding strategy corresponding to the TRP operation mode in the first group DCI to obtain the indication information of the beam mapping scheme.

In some embodiments, the apparatus further includes a processing module, and the processing module is configured to: configure a beam mapping scheme corresponding to the indication information according to a higher-layer signaling sent by the base station; or predefine a beam mapping scheme corresponding to the indication information for the UE.

In some embodiments, the acquiring module includes a third receiving unit and a determining unit. The third receiving unit is configured to receive second group DCI sent by the base station in a PDCCH, and the second group DCI carries the indication information of the beam mapping scheme; and the determining unit is configured to determine a corresponding TRP operation mode according to the indication information of the beam mapping scheme carried in the second group DCI.

In some embodiments, the acquiring module includes a fourth receiving unit, and the fourth receiving unit is configured to receive second specific DCI for the UE sent by the base station in a PDCCH. The second specific DCI carries the indication information of the beam mapping scheme and/or the indication information of the TRP operation mode.

In some embodiments, the second specific DCI carries the indication information of the TRP operation mode. The apparatus further includes a processing module, and the processing module is configured to: configure a beam mapping scheme corresponding to the indication information according to a higher-layer signaling sent by the base station; or predefine a beam mapping scheme corresponding to the indication information for the UE.

In some embodiments, the indication information of the beam mapping scheme carried in the control signaling indicates a combination of the mapping pattern and the time unit selected by the base station, or indicates that the base station has not selected a beam mapping scheme.

In some embodiments, the indication information of the beam mapping scheme carried in the control signaling indicates one of the mapping pattern and the time unit. The apparatus further includes a configuring module, and the configuring module is configured to configure the other one of the mapping pattern and the time unit according to a higher-layer signaling sent by the base station.

In some embodiments, the apparatus further includes a decoding module, and the decoding module is configured to decode specific DCI for the UE sent by the base station using a decoding strategy corresponding to the TRP operation mode to obtain data scheduling information used by a physical uplink shared channel PUSCH. The data scheduling information includes data sending information based on codebook transmission or data sending information based on non-codebook transmission.

According to a fourth aspect of embodiments of the present disclosure, there is provided a data communication apparatus, which is applied to a base station and includes: a sending module and a receiving module. The sending module is configured to send a control signaling to a user equipment UE. The control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units. The receiving module is configured to receive data sent by the UE in the TRP operation mode and/or the beam mapping scheme.

In some embodiments, the sending module includes a first sending unit, and the first sending unit is configured to send first group downlink control information DCI to the UE in a physical downlink control channel PDCCH. The first group DCI carries the indication information of the TRP operation mode.

In some embodiments, the sending module includes a second sending unit, and the second sending unit is configured to send to the UE first specific DCI for the UE. The first specific DCI is configured to be decoded using a decoding strategy corresponding to the TRP operation mode in the first group DCI and carries the indication information of the beam mapping scheme.

In some embodiments, the apparatus further includes a first configuring module, and the first configuring module is configured to send to the UE a higher-layer signaling for configuring a beam mapping scheme corresponding to the indication information.

In some embodiments, the sending module includes a third sending unit, and the third sending unit is configured to send second group DCI to the UE in a PDCCH. The second group DCI carries the indication information of the beam mapping scheme, and the indication information of the beam mapping scheme corresponds to the TRP operation mode.

In some embodiments, the sending module includes a fourth sending unit, and the fourth sending unit is configured to send to the UE second specific DCI for the UE in a PDCCH. The second specific DCI carries the indication information of the beam mapping scheme and/or the indication information of the TRP operation mode.

In some embodiments, the second specific DCI carries the indication information of the TRP operation mode. The apparatus further includes a first configuring module, and the first configuring module is configured to send to the UE a higher-layer signaling for configuring a beam mapping scheme corresponding to the indication information.

In some embodiments, the indication information of the beam mapping scheme carried in the control signaling indicates a combination of the mapping pattern and the time unit selected by the base station, or indicates that the base station has not selected a beam mapping scheme.

In some embodiments, the indication information of the beam mapping scheme carried in the control signaling indicates one of the mapping pattern and the time unit. The apparatus further includes a second configuring module, and the second configuring module is configured to send to the UE a higher-layer signaling for configuring the other one of the mapping pattern and the time unit.

In some embodiments, the apparatus further includes a scheduling module, and the scheduling module is configured to: schedule according to a channel state CSI measurement value to determine at least one of the TRP operation mode or the beam mapping scheme; and/or perform beam management to determine at least one of the TRP operation mode or the beam mapping scheme.

According to a fifth aspect of embodiments of the present disclosure, there is provided a communication device, which includes: a processor; a transceiver; a memory; and a computer program stored on the memory. The processor is configured to run the computer program to implement the data communication method as described in the first aspect of embodiments of the present disclosure.

According to a sixth aspect of embodiments of the present disclosure, there is provided a communication device, which includes: a processor; a transceiver; a memory; and a computer program stored on the memory. The processor is configured to run the computer program to implement the data communication method as described in the second aspect of embodiments of the present disclosure.

According to a seventh aspect of embodiments of the present disclosure, there is provided a processor-readable storage medium having stored therein a computer program, and the computer program is configured to cause a processor to execute the data communication method as described in the first aspect of embodiments of the present disclosure, or the data communication method as described in the second aspect of embodiments of the present disclosure.

In the data communication method and apparatus provided in embodiments of the present disclosure, after the base station sends the control signaling to the UE, since the control signaling carries the indication information of the TRP operation mode and/or the beam mapping scheme, the UE sends data in the uplink channel using the corresponding TRP operation mode and/or beam mapping scheme under the scheduling of the base station, and correspondingly, the base station receives the data sent by the UE in the TRP operation mode and/or the beam mapping scheme, so that embodiments of the present disclosure can be applied to channels like PUSCH and PUCCH, and realize the switch of the single-TRP-based communication or the multi-TRP-based communication in these channels, or realize the scheduling of the beam mapping scheme, thereby improving the data communication quality.

FIG. 1 is a schematic flowchart of a data communication method provided in embodiments of the present disclosure, which is executed by a user equipment UE to flexibly implement data communication of a terminal to a base station through a multi-TRP-based communication or a single-TRP-based communication in an uplink channel under the scheduling of the base station on a TRP operation mode and/or a beam mapping scheme. Typically, the uplink channel may be a physical uplink control channel PUCCH and/or a physical uplink shared channel PUSCH. The uplink channel may typically be the physical uplink shared channel PUSCH. As shown in FIG. 1, the data communication method includes the following steps.

In step 101, control signaling sent by a base station is acquired.

In some embodiments of the present disclosure, the control signaling may be downlink control information (DCI) or other signaling transmitted in a physical downlink control channel PDCCH, or may be control signaling transmitted in a physical downlink shared channel PDSCH. The specific form of the control signaling is not limited in embodiments of the present disclosure.

The control signaling carries indication information of a transmission and reception point TRP operation mode and/or a beam mapping scheme. The TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units.

After acquiring the control signaling, the UE determines, based on the indication information carried in the control signaling, the single-TRP-based communication or the multi-TRP-based communication specified by scheduling of the base station. In a case where the TRP operation mode specified by the scheduling of the base station is the multi-TRP-based communication, a beam mapping scheme may also be specified, including at least one of the time unit or a mapping pattern between multiple uplink beams corresponding to multiple TRPs and time units, so that the UE can flexibly switch data communication between the multi-TRP-based communication and the single-TRP-based communication of the base station under the scheduling of the base station.

In some embodiments, the mapping pattern between beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs (transmission configuration indications) are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;
2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;
3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;
4) Bit mapping, in which a mapping pattern between a beam corresponding to each TRP and the time unit is indicated through a Bitmap.

In some embodiments, for the aforementioned time unit, alternative solutions may be one of, but not limited to, the following cases:

1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In step 102, data is sent to the base station in the TRP operation mode and/or the beam mapping scheme.

In some embodiments, in a PUSCH, the UE sends an uplink transmission (PUSCH transmission) to the base station in the TRP operation mode and/or the beam mapping scheme. In embodiments of the present disclosure, the uplink transmission may be a signaling, data, or a hybrid transmission of a signaling and data.

In some embodiments, in a PUCCH, the UE sends an uplink transmission (PUCCH transmission) to the base station in the TRP operation mode and/or the beam mapping scheme. In embodiments of the present disclosure, the uplink transmission may be a signaling, data, or a hybrid transmission of a signaling and data.

The UE sends the uplink transmission to the base station in the TRP operation mode and/or the beam mapping scheme specified by the scheduling of the base station. Since a retransmission mechanism adopted by the UE has a certain correlation with the TRP operation mode and the beam mapping scheme, optimal allocation of resources is realized through the scheduling of the TRP operation mode and/or the beam mapping scheme by the base station, thereby improving the communication quality of the uplink channel.

In embodiments of the present disclosure, after the base station sends the control signaling to the UE, since the control signaling carries the indication information of the TRP operation mode and/or the beam mapping scheme, the UE sends the uplink transmission in the uplink channel using the corresponding TRP operation mode and/or beam mapping scheme under the scheduling of the base station, and correspondingly, the base station receives the uplink transmission sent by the UE in the TRP operation mode and/or the beam mapping scheme, so that embodiments of the present disclosure can be applied to channels like PUSCH and PUCCH, and realize the switch of the single-TRP-based communication or the multi-TRP-based communication in these channels, or realize the scheduling of the beam mapping scheme, thereby improving the communication quality.

Figure 2:
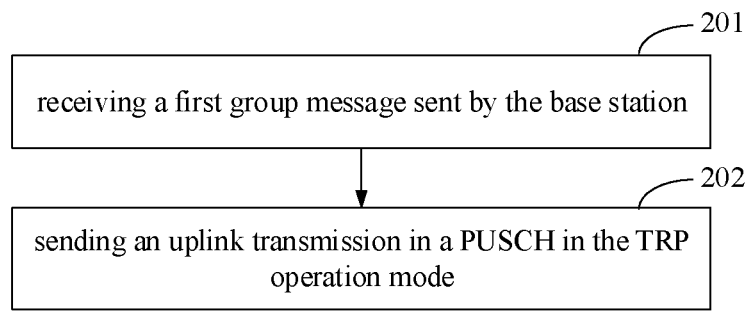
FIG. 2 is a schematic flowchart of a data communication method provided in embodiments of the present disclosure.

Embodiments of the present disclosure provide another data communication method, and FIG. 2 is a schematic flowchart of another data communication method provided in embodiments of the present disclosure, which is executed by a UE. In the method provided in embodiments of the present disclosure, the base station only needs to schedule the TRP operation mode of the UE, and informs the UE whether the TRP operation mode specified by the scheduling of the base station is a single-TRP-based communication or a multi-TRP-based communication.

As shown in FIG. 2, the method may include the following steps.

In step 201, a first group message sent by a base station is received.

The first group message carries indication information of a TRP operation mode. The TRP operation mode is a single-TRP-based communication or a multi-TRP-based communication.

In some embodiments of the present disclosure, the message may be downlink control information (DCI) or other signaling transmitted in a PDCCH, or may be a signaling transmitted in a PDSCH. The specific form of the message is not limited in embodiments of the present disclosure. That is, in some embodiments of the present disclosure, the first group message may be, for example, first group DCI.

The first group message is a group message that is generated by the base station after determining a TRP operation mode suitable for the UE from the single-TRP-based communication and the multi-TRP-based communication based on a parameter and carries the indication information of the TRP operation mode. In some embodiments, the parameter may be any one or more of: beam management, a CSI measurement value obtained by channel quality measurement on an uplink/downlink channel state, and scheduling of the TRP operation mode.

The first group is a group of UEs to which the base station sends the first group message, and includes the UE executing embodiments of the present disclosure. The UE obtains an information bit position corresponding to the UE in the first group message and a radio network temporary identity (RNTI) used for descrambling according to configuration information received in advance from the base station, a communication protocol, a condition parameter or a pre-stored parameter. In some embodiments, the first group message is a bitmap with a first number of bits, and each bit of the first group message corresponds to one or more UEs to indicate the RNTI for descrambling corresponding to the one or more UEs. In some embodiments, the UE may determine a bit corresponding to the UE according to configuration information sent by a higher-layer base station. In other embodiments, the UE may determine the bit corresponding to the UE according to a corresponding communication protocol. In yet other embodiments, the UE may determine the bit corresponding to the UE according to the condition parameter, and the condition parameter may be any one of: a channel condition, a load condition, and the like. In still yet other embodiments, the UE may determine the bit corresponding to the UE according to the pre-stored parameter; and the pre-stored parameter may be any one of: a UE class (UEclass), a UE identification (UEID), and the like.

After receiving the first group message, the UE descrambles the first group message according to the obtained RNTI, and reads the information bit position corresponding to itself, to obtain the TRP operation mode corresponding to the UE.

In step 202, an uplink transmission is sent in an uplink channel in the TRP operation mode.

In some embodiments, in a PUSCH, the UE sends an uplink transmission (PUSCH transmission) to the base station in the TRP operation mode. In embodiments of the present disclosure, the uplink transmission may be a signaling, data, or a hybrid transmission of a signaling and data.

In some embodiments, in a PUCCH, the UE sends an uplink transmission (PUCCH transmission) to the base station in the TRP operation mode. In embodiments of the present disclosure, the uplink transmission may be a signaling, data, or a hybrid transmission of a signaling and data.

In some embodiments, after obtaining the TRP operation mode carried in the first group message, the UE uses a decoding strategy corresponding to the TRP operation mode to decode a specific message corresponding to the UE sent by the base station to the UE, so as to determine data scheduling information configured to the UE by the base station, such as data sending information based on codebook transmission or data sending information based on non-codebook transmission. According to the data sending information based on the codebook transmission or the data sending information based on the non-codebook transmission, the UE sends data in an uplink channel (such as PUSCH or PUCCH) using the operation mode of the single-TRP-based communication or the multi-TRP-based communication specified by the scheduling of the base station.

In some embodiments of the present disclosure, the specific message may be a specific DCI.

In a case where the TRP operation mode is the multi-TRP-based communication, since the UE has been pre-configured the beam mapping scheme by the base station, or the UE has pre-defined the beam mapping scheme, the UE can execute the beam mapping scheme.

For example, the base station may configure the beam mapping scheme for the UE according to a signaling, such as a radio resource control (RRC) signaling, sent by the base station to the UE. Therefore, in the case where the TRP operation mode is the multi-TRP-based communication, the UE sends the data in the uplink channel (e.g., PUSCH or PUCCH) in the operation mode of the multi-TRP-based communication according to the configured beam mapping scheme. For another example, the base station may determine the beam mapping scheme corresponding to the UE according to a communication protocol. For yet another example, the base station may determine the beam mapping scheme corresponding to the UE according to a condition parameter, and the condition parameter may be any one of: a channel condition, a load condition, and the like. For still yet another example, the base station may determine the beam mapping scheme corresponding to the UE according to a pre-stored parameter; and the pre-stored parameter may be any one of: a UE class (UEclass), a UE identification (UEID), and the like.

In some embodiments, the beam mapping scheme includes a time unit and/or a mapping pattern between beams corresponding to the multi-TRP-based communication and time units. The mapping pattern between the beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs (transmission configuration indications) are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;

2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;

3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;

4) Bit mapping, in which a mapping pattern between a beam corresponding to each TRP and the time unit is indicated through a Bitmap.

For the aforementioned time unit, alternative solutions may be one of, but not limited to, the following cases:
1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In embodiments of the present disclosure, after the base station sends the DCI to the UE in the PDCCH, since the DCI carries the indication information of the TRP operation mode and/or the beam mapping scheme, the UE sends data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 3:
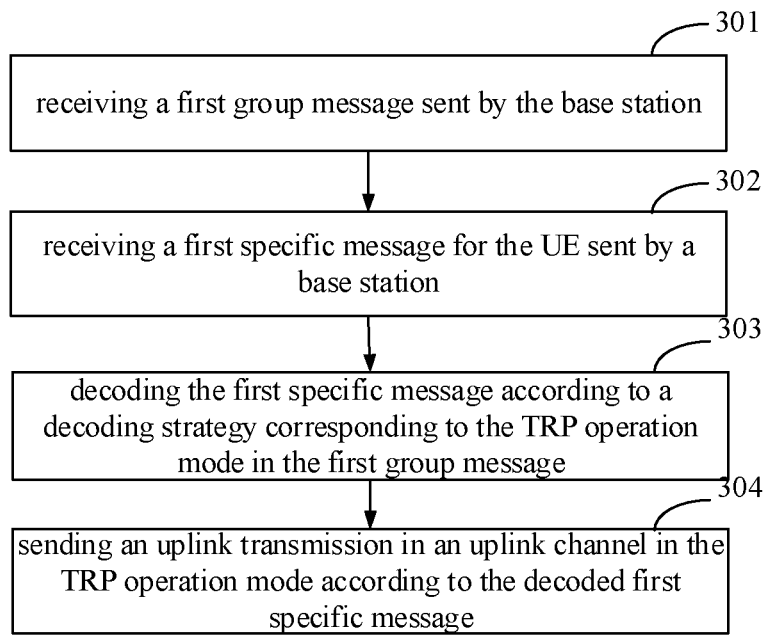
FIG. 3 is a schematic flowchart of a data communication method provided in embodiments of the present disclosure.

FIG. 3 is a schematic flowchart of another data communication method provided in embodiments of the present disclosure, which is executed by a UE. In the method provided in embodiments of the present disclosure, a base station schedules a TRP operation mode and a beam mapping scheme of the UE, and the UE obtains whether the TRP operation mode specified by the scheduling of the base station is a single-TRP-based communication or a multi-TRP-based communication and obtains the beam mapping scheme, and on this basis, the UE sends data in an uplink channel.

As shown in FIG. 3, the method may include the following steps.

In step 301, a first group message sent by a base station is received.

The first group message carries the indication information of the TRP operation mode. The TRP operation mode is the single-TRP-based communication or the multi-TRP-based communication.

In some embodiments of the present disclosure, the message may be downlink control information (DCI) or other signaling transmitted in a PDCCH, or may be a signaling transmitted in a PDSCH. The specific form of the message is not limited in embodiments of the present disclosure. That is, in some embodiments of the present disclosure, the first group message may be, for example, first group DCI. The first group message is a group message that is generated by the base station after determining a TRP operation mode suitable for the UE from the single-TRP-based communication and the multi-TRP-based communication based on a parameter and carries the indication information of the TRP operation mode. In some embodiments, the parameter may include any one of: beam management, a CSI measurement value obtained by channel quality measurement on an uplink/downlink channel state, scheduling of the TRP operation mode, and the like.

The first group message is sent by the base station to a group of UEs, including the UE executing embodiments of the present disclosure. The UE has received configuration information sent by the base station through a higher-layer signaling in advance, so that the UE has learned an information bit position corresponding to the UE in the first group DCI, and has learned an RNTI for descrambling. After receiving the first group DCI, the UE descrambles the first group DCI according to the RNTI, and reads the information bit position corresponding to itself, so as to obtain the TRP operation mode corresponding to the UE.

In step 302, a first specific message for the UE sent by the base station is received.

The first specific message is sent for the UE and is used to dynamically configure the UE. The first specific message carries data scheduling information, and the data scheduling information includes data sending information based on codebook transmission or data sending information based on non-codebook transmission. In a case where the TRP operation mode is the multi-TRP-based communication, the first specific message further includes indication information of the beam mapping scheme.

In some embodiments of the present disclosure, the first specific message may be DCI, that is, the first specific message may be first specific DCI.

In some embodiments, the beam mapping scheme includes a mapping pattern and a time unit. The mapping pattern between beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;

2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;

3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;

4) Bit mapping, in which a mapping pattern between a beam corresponding to each TRP and the time unit is indicated through a Bitmap.

In some embodiments, for the aforementioned time unit, alternative solutions may be one of, but not limited to, the following cases:

1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In step 303, the first specific message is decoded according to a decoding strategy corresponding to the TRP operation mode in the first group message.

After determining the TRP operation mode corresponding to the UE, the UE can obtain a bit position of a specific information field to be read in the first specific message (such as the first specific DCI) sent by the base station through the downlink channel (such as PDCCH or PDSCH), this is because the UE has pre-configured decoding strategies for the first specific message of the UE in different TRP operation modes, and the decoding strategy indicates the bit position of the specific information field that needs to be read by the UE. The UE decodes the first specific message according to the decoding strategy and reads the corresponding bit position.

If the TRP operation mode of the UE is the multi-TRP-based communication, the first specific message is decoded to obtain the indication information of the beam mapping scheme and the data scheduling information, such as data sending information based on codebook transmission or data sending information based on non-codebook transmission, etc. If the TRP operation mode of the UE is the single-TRP-based communication, the first specific message is decoded to obtain the data scheduling information.

In some embodiments, the indication information of the beam mapping scheme may be an identifier occupying several bits, corresponding to the mapping pattern, the time unit, or the combination of the mapping pattern and the time unit in the beam mapping scheme. Specifically, for determining the mapping scheme based on the identifier, there are at least the following possible implementations.

As a first possible implementation, the base station sends one of the mapping pattern and the time unit in advance, so that the UE has preconfigured the mapping pattern or the time unit. The base station also sends to or predefines for the UE a correspondence between the identifier and the other one of the mapping pattern and the time unit, so that the UE can determine the corresponding mapping pattern or time unit according to the identifier in the first specific message.

For example, the base station configures the mapping pattern through an RRC signaling, and configures the correspondence between the identifier and the time unit through the RRC signaling or other higher-layer signaling. After receiving the first specific message (e.g., the first specific DCI), the UE determines the corresponding time unit through the identifier in the first specific message. The correspondence between the identifier and the time unit is shown in Table 1 below.

TABLE 1

An example of the correspondence between the identifier and the time unit

| identifier | time unit |
|---|---|
| 1 | nominal communication timing |
| 2 | actual communication timing |
| 3 | slot-level mapping |

It can be understood that each element and each correspondence in Table 1 exist independently; even though these elements and these correspondences are illustratively listed in the same Table, it does not represent that all the elements and correspondences in Table 1 must coexist as shown in Table 1. The value of each element and each correspondence are independent of the value of any other elements or any other correspondences shown in Table 1. Therefore, those skilled in the art can understand that the value of each element and each correspondence in Table 1 correspond to an independent embodiment.

For another example, the base station configures the time unit through an RRC signaling, and configures the correspondence between the identifier and the mapping pattern through the RRC signaling or other higher-layer signaling. After receiving the first specific DCI, the UE determines the corresponding mapping pattern through the identifier in the first specific message.

As a second possible implementation, the base station sends a correspondence between the identifier and the beam mapping scheme in advance through a higher-layer signaling, such as an RRC signaling, or the UE predefines the correspondence between the identifier and the beam mapping scheme. The beam mapping scheme is a combination of the mapping pattern and the time unit, so that the UE can determine a corresponding combination of the mapping pattern and the time unit according to the identifier in the first specific DCI.

TABLE 2

An example of the correspondence between the identifier and the beam mapping scheme

| identifier | combination of the mapping pattern and the time unit |
|---|---|
| 0 | alternate mapping to nominal communication timing |
| 1 | alternate mapping to actual communication timing |
| 2 | continuous mapping to actual communication timing |
| 3 | continuous mapping to actual communication timing |
| ... | ... |
| 6 | bit mapping to actual communication timing |
| 7 | bit mapping to different slots |

It can be understood that each element and each correspondence in Table 2 exist independently; even though these elements and these correspondences are illustratively listed in the same Table, it does not represent that all the elements and correspondences in Table 2 must coexist as shown in Table 2. The value of each element and each correspondence are independent of the value of any other elements or any other correspondences shown in Table 2. Therefore, those skilled in the art can understand that the value of each element and each correspondence in Table 2 correspond to an independent embodiment.

As a third possible implementation, the base station sends the beam mapping scheme in advance, or pre-defines the beam mapping scheme for the UE, including a possible mapping pattern between beams corresponding to the multi-TRP-based communication and time units and/or a possible time unit. Based on the identifier carried in the first specific DCI, it is determined whether to adopt the mapping pattern and/or the time unit. In some embodiments, the base station may send the beam mapping scheme through a higher-layer signaling.

In step 304, an uplink transmission is sent in an uplink channel in the TRP operation mode according to the decoded first specific message.

In some embodiments of the present disclosure, the specific message may be specific DCI.

In some embodiments, the uplink channel is a PUSCH or a PUCCH. In some embodiments, the uplink channel may be a PUSCH.

In response to the TRP operation mode being the single-TRP-based communication, the data scheduling information can be obtained according to the decoded first specific DCI, and data is sent in the PUSCH in the single-TRP-based communication according to the data scheduling information.

Alternatively, in response to the TRP operation mode being the multi-TRP-based communication, the data scheduling information can be obtained and the beam mapping scheme can be determined according to the decoded first specific DCI, and data is sent in the PUSCH in the multi-TRP-based communication according to the beam mapping scheme and the data scheduling information.

In some embodiments, in the PUSCH, the UE sends the uplink transmission (PUSCH transmission) to the base station. In embodiments of the present disclosure, the uplink transmission may be a signaling, data, or a hybrid transmission of a signaling and data.

In some embodiments, in the PUCCH, the UE sends the uplink transmission (PUCCH transmission) to the base station. In embodiments of the present disclosure, the uplink transmission may be a signaling, data, or a hybrid transmission of a signaling and data.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 4:
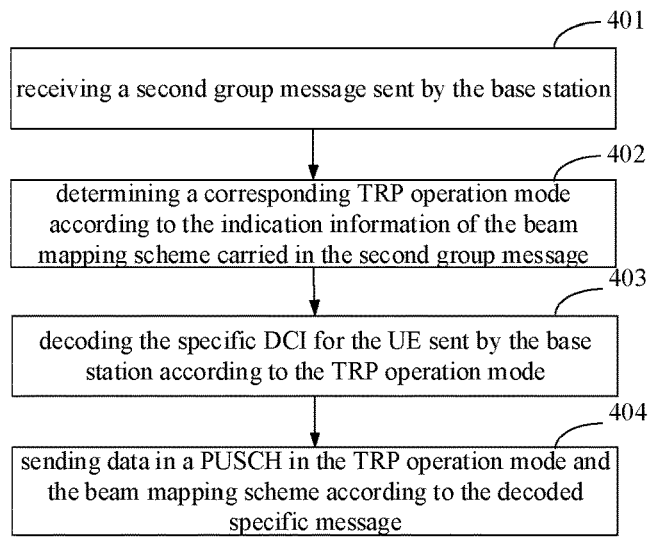
FIG. 4 is a schematic flowchart of a data communication method provided in embodiments of the present disclosure.

FIG. 4 is a schematic flowchart of another data communication method provided in embodiments of the present disclosure, which is executed by a UE. In the method provided in embodiments of the present disclosure, the base station schedules a TRP operation mode and a beam mapping scheme of the UE, and the UE learns indirectly whether the TRP operation mode specified by the scheduling of the base station is a single-TRP-based communication or a multi-TRP-based communication, and learns indirectly the beam mapping scheme, and on this basis, the UE sends data in an uplink channel.

As shown in FIG. 4, the method may include the following steps.

In step 401, a second group message sent by the base station is received.

The second group message carries indication information of the beam mapping scheme.

The second group message may be downlink control information (DCI) or other signaling transmitted in a PDCCH, or may be a signaling transmitted in a PDSCH. The specific form of the message is not limited in embodiments of the present disclosure. That is, in some embodiments of the present disclosure, the second group message may be, for example, second group DCI.

The second group message is a group message that is generated by the base station after determining a beam mapping scheme suitable for the UE from a plurality of candidate beam mapping schemes based on a parameter and carries the indication information of the beam mapping scheme of the UE. In some embodiments, the parameter may be at least one of: beam management, a CSI measurement value obtained by channel quality measurement on an uplink/downlink channel state, or scheduling of the beam mapping scheme.

The second group message is sent by the base station to a group of UEs, including the UE executing embodiments of the present disclosure. The UE has received configuration information sent by the base station in advance, so that the UE has learned an information bit position corresponding to the UE in the second group DCI, and has learned an RNTI for descrambling. After receiving the second group DCI, the UE descrambles the second group DCI according to the RNTI, and reads the information bit position corresponding to itself, so as to obtain the beam mapping scheme corresponding to the UE.

In some embodiment, the UE obtains the information bit position corresponding to the UE in the second group message and the RNTI for descrambling according to configuration information received in advance from the base station, a communication protocol, a condition parameter or a pre-stored parameter. In some embodiments, the second group message is a bitmap with a first number of bits, and each bit of the second group message corresponds to one or more UEs to indicate an RNTI for descrambling corresponding to the one or more UEs. In some embodiments, the UE may determine a bit corresponding to the UE according to configuration information sent by a higher-layer base station. In other embodiments, the UE may determine the bit corresponding to the UE according to a corresponding communication protocol. In yet other embodiments, the UE may determine the bit corresponding to the UE according to the condition parameter, and the condition parameter may be any one of: a channel condition, a load condition, and the like. In still yet other embodiments, the UE may determine the bit corresponding to the UE according to the pre-stored parameter; and the pre-stored parameter may be any one of: a UE class (UEclass), a UE identification (UEID), and the like.

In some embodiments, the beam mapping scheme includes a mapping pattern and a time unit. The mapping pattern between beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;
2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;
3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;
4) Bit mapping, in which a mapping pattern between a beam corresponding to each TRP and the time unit is indicated through a Bitmap.

In some embodiments, for the aforementioned time unit, alternative solutions may be one of, but not limited to, the following cases:

1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In step 402, a corresponding TRP operation mode is determined according to the indication information of the beam mapping scheme carried in the second group message.

In some embodiments, the indication information of the beam mapping scheme may be an identifier occupying several bits, and there is a correspondence between the identifier and the beam mapping scheme as well as the TRP operation mode. The identifier may correspond to the mapping pattern in the beam mapping scheme and the TRP operation mode, or correspond to the time unit and the TRP operation mode, or correspond to the TRP operation mode and the combination of the mapping pattern and the time unit.

For determining the corresponding mapping scheme and TRP operation mode based on the identifier, there are at least the following possible implementations.

As a first possible implementation, the base station has pre-configured one of the mapping pattern and the time unit for the UE through a higher-layer signaling, such as an RRC signaling, or pre-defined one of the mapping pattern and the time unit for the UE. During the scheduling, the base station sends the correspondence between the identifier and the other one of the mapping pattern and the time unit through the higher-layer signaling, so that the UE can determine the corresponding mapping pattern or time unit according to the identifier in the second group DCI.

For example, the base station configures the mapping pattern through an RRC signaling, and configures the correspondence between the identifier and the time unit as well as the TRP operation mode through the RRC signaling or other higher-layer signaling. After receiving the second group DCI, the UE determines the corresponding time unit and TRP operation mode according to the identifier in the second group DCI. Specifically, the correspondence between the identifier and the time unit as well as the TRP operation mode is shown in Table 3 below.

TABLE 3

An example of the correspondence between the identifier and the time unit as well as the TRP operation mode

| identifier | time unit | TRP operation mode |
|---|---|---|
| 0 | none | single-TRP-based communication |
| 1 | nominal communication timing | multi-TRP-based communication |
| 2 | actual communication timing | multi-TRP-based communication |
| 3 | slot-level mapping | multi-TRP-based communication |

It can be understood that each element and each correspondence in Table 3 exist independently; even though these elements and these correspondences are illustratively listed in the same Table, it does not represent that all the elements and correspondences in Table 3 must coexist as shown in Table 3. The value of each element and each correspondence are independent of the value of any other elements or any other correspondences shown in Table 3. Therefore, those skilled in the art can understand that the value of each element and each correspondence in Table 3 correspond to an independent embodiment.

For another example, the base station configures the time unit through an RRC signaling, and configures the correspondence between the identifier and the mapping pattern as well as the TRP operation mode through the RRC signaling or other higher-layer signaling. After receiving the second group DCI, the UE determines the corresponding mapping pattern and TRP operation mode through the identifier in the second group DCI.

As a second possible implementation, the base station sends the correspondence between the identifier and the beam mapping scheme in advance through a higher-layer signaling, such as an RRC signaling, or the UE predefines the correspondence between the identifier and the beam mapping scheme. The beam mapping scheme is a combination of the mapping pattern and the time unit, so that the UE can determine the corresponding combination of the mapping pattern and the time unit according to the identifier in the second group DCI.

TABLE 4

An example of the correspondence between the identifier and the beam mapping scheme as well as the TRP operation mode

| identifier | combination of mapping pattern and time unit | TRP operation mode |
|---|---|---|
| 0 | none | single-TRP-based communication |
| 1 | alternate mapping to nominal communication timing | multi-TRP-based communication |
| 2 | alternate mapping to actual communication timing | multi-TRP-based communication |
| 3 | continuous mapping to actual communication timing | multi-TRP-based communication |
| 4 | continuous mapping to actual communication timing | multi-TRP-based communication |
| ... | ... | ... |
| 7 | bit mapping to actual communication timing | multi-TRP-based communication |

It can be understood that each element and each correspondence in Table 4 exist independently; even though these elements and these correspondences are illustratively listed in the same Table, it does not represent that all the elements and correspondences in Table 4 must coexist as shown in Table 4. The value of each element and each correspondence are independent of the value of any other elements or any other correspondences shown in Table 4. Therefore, those skilled in the art can understand that the value of each element and each correspondence in Table 4 correspond to an independent embodiment.

As a third possible implementation, the base station sends the beam mapping scheme in advance through a higher-layer signaling, or pre-defines the beam mapping scheme for the UE, including a possible mapping pattern between beams corresponding to the multi-TRP-based communication and time units and/or a possible time unit. Based on the identifier carried in the second specific DCI, it is determined whether to adopt the mapping pattern and/or the time unit.

In step 403, the specific DCI for the UE sent by the base station is decoded according to the TRP operation mode.

The UE has pre-configured decoding strategies in different TRP operation modes, and the decoding strategy indicates a bit position of a specific information field that needs to be read by the UE. The UE decodes the specific DCI based on the decoding strategy and reads the bit position corresponding to the specific DCI to obtain data scheduling information, such as data sending information based on codebook transmission or data sending information based on non-codebook transmission.

For example, for the multi-TRP-based communication of the UE, an indication field of a scheduling request indication (SRI) or a transmitted pre-coding matrix indicator (TPMI)/rank indication (RI) are directly extended to 4 bits for the communication of two TRP beams, if an indication field for the single-TRP-based communication is a 2-bit indication field.

In step 404, data is sent in a PUSCH in the TRP operation mode and the beam mapping scheme according to the decoded specific message.

In some embodiments of the present disclosure, the specific message may be a specific DCI.

In response to the TRP operation mode being the single-TRP-based communication, the data scheduling information can be obtained according to the decoded specific DCI, and data is sent in an uplink channel (such as a PUSCH or a PUCCH) in the single-TRP-based communication according to the data scheduling information.

Alternatively, in response to the TRP operation mode being the multi-TRP-based communication, the data scheduling information can be obtained according to the decoded specific message, and data is sent in an uplink channel (such as a PUSCH or a PUCCH) in the multi-TRP-based communication according to the beam mapping scheme determined in the previous steps and the data scheduling information.

In some embodiments, the uplink channel is a PUCCH.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 5:
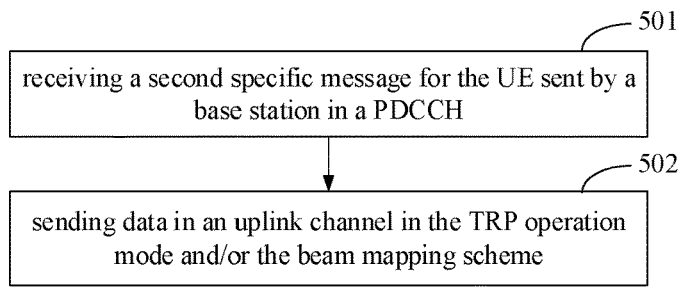
FIG. 5 is a schematic flowchart of a data communication method provided in embodiments of the present disclosure.

FIG. 5 is a schematic flowchart of another data communication method provided in embodiments of the present disclosure, which is executed by a UE. In the method provided in embodiments of the present disclosure, the base station schedules a TRP operation mode and a beam mapping scheme of the UE, the UE learns whether the TRP operation mode specified by the scheduling of the base station is a single-TRP-based communication or a multi-TRP-based communication and learns the beam mapping scheme, and on this basis, the UE sends data in an uplink channel.

As shown in FIG. 5, the method may include the following steps.

In step 501, a second specific message for the UE sent by a base station in a PDCCH is received.

The second specific message carries indication information of a beam mapping scheme and/or indication information of a TRP operation mode.

The second specific message is a specific message for the UE that is generated by the base station after determining a beam mapping scheme and/or a TRP operation mode suitable for the UE from a plurality of candidate beam mapping schemes based on beam management or by scheduling the beam mapping schemes according to a CSI measurement value obtained by channel quality measurement on an uplink/downlink channel state, and carries the indication information of the beam mapping scheme and/or the indication information of the TRP operation mode of the UE.

In some embodiments of the present disclosure, the second specific message may be specific DCI, i.e., second specific DCI.

In some embodiments, the beam mapping scheme includes a mapping pattern and a time unit. The mapping pattern between beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;

2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;

3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;

4) Bit mapping, in which a mapping pattern between a beam corresponding to each TRP and the time unit is indicated through a Bitmap.

In some embodiments, for the aforementioned time unit, alternative solutions may be one of, but not limited to, the following cases:

1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

Further, after receiving the second specific message, the UE may try to decode the second specific message using predefined or preconfigured candidate decoding strategies until the decoding succeeds to obtain the indication information of the beam mapping scheme and/or the indication information of the TRP operation mode carried in the second specific message.

In some embodiments, the indication information of the beam mapping scheme may be an identifier occupying several bits, corresponding to the mapping pattern, the time unit, or the combination of the mapping pattern and the time unit in the beam mapping scheme. Specifically, for determining the mapping scheme based on the identifier, there are at least the following possible implementations.

As a first possible implementation, the base station sends one of the mapping pattern and the time unit in advance through a higher-layer signaling, such as an RRC signaling, so that the UE has preconfigured the mapping pattern or the time unit. The base station also sends to or predefines for the UE a correspondence between the identifier and the other one of the mapping pattern and the time unit through the higher-layer signaling, so that the UE can determine the corresponding mapping pattern or time unit according to the identifier in the second specific DCI.

For example, the base station configures the mapping pattern through an RRC signaling, and configures the correspondence between the identifier and the time unit through the RRC signaling or other higher-layer signaling. After receiving the second specific DCI, the UE determines the corresponding time unit through the identifier in the second specific DCI. The correspondence between the identifier and the time unit is shown in Table 5 below.

TABLE 5

Another example of the correspondence between the identifier and the time unit

| identifier | time unit |
| --- | --- |
| 0 | none |
| 1 | nominal communication timing |
| 2 | actual communication timing |
| 3 | slot-level mapping |

It can be understood that each element and each correspondence in Table 5 exist independently; even though these elements and these correspondences are illustratively listed in the same Table, it does not represent that all the elements and correspondences in Table 5 must coexist as shown in Table 5. The value of each element and each correspondence are independent of the value of any other elements or any other correspondences shown in Table 5. Therefore, those skilled in the art can understand that the value of each element and each correspondence in Table 5 correspond to an independent embodiment.

It should be noted that, the term "none" in Table 5 indicates that the base station has not selected a time unit for the case of the single-TRP-based communication mode.

For another example, the base station configures the time unit through an RRC signaling, and configures the correspondence between the identifier and the mapping pattern through the RRC signaling or other higher-layer signaling. After receiving the second specific DCI, the UE determines the corresponding mapping pattern through the identifier in the second specific DCI.

As a second possible implementation, the base station sends the correspondence between the identifier and the beam mapping scheme in advance through a higher-layer signaling, such as an RRC signaling, or the UE predefines the correspondence between the identifier and the beam mapping scheme. The beam mapping scheme is a combination of the mapping pattern and the time unit, so that the UE can determine a corresponding combination of the mapping pattern and the time unit according to the identifier in the second specific DCI. Table 6 shows the correspondence between the identifier and the beam mapping scheme.

TABLE 6

An example of the correspondence between the identifier and the beam mapping scheme

| identifier | combination of the mapping pattern and the time unit |
| --- | --- |
| 0 | none |
| 1 | Periodic mapping to nominal communication timing |
| 2 | Periodic mapping to actual communication timing |
| 3 | continuous mapping to actual communication timing |
| 4 | continuous mapping to actual communication timing |
| ... | ... |
| 7 | bit mapping to actual communication timing |

It can be understood that each element and each correspondence in Table 6 exist independently; even though these elements and these correspondences are illustratively listed in the same Table, it does not represent that all the elements and correspondences in Table 6 must coexist as shown in Table 6. The value of each element and each correspondence are independent of the value of any other elements or any other correspondences shown in Table 6. Therefore, those skilled in the art can understand that the value of each element and each correspondence in Table 6 correspond to an independent embodiment.

It should be noted that, the term "none" in Table 6 indicates that the base station has not selected a beam mapping scheme, i.e., a combination of the mapping pattern and the time unit, for the case of the single-TRP-based communication mode.

As a third possible implementation, the base station sends the beam mapping scheme in advance through a higher-layer signaling, or pre-defines the beam mapping scheme for the UE, including a possible mapping pattern between beams corresponding to the multi-TRP-based communication and time units and/or a possible time unit. Based on the identifier carried in the second specific DCI, it is determined whether to adopt the mapping pattern and/or the time unit.

In step 502, data is sent in an uplink channel in the TRP operation mode and/or the beam mapping scheme.

In some embodiments, the uplink channel may be a PUSCH or a PUCCH. In some embodiments, the uplink channel may be a PUSCH.

In some embodiments, the second specific message may also carry data scheduling information, and the data scheduling information includes: data sending information based on codebook transmission or data sending information based on non-codebook transmission.

In response to the TRP operation mode being the single-TRP-based communication, the data is sent in a PUSCH in the single-TRP-based communication according to the data scheduling information.

Alternatively, in response to the TRP operation mode being the multi-TRP-based communication, the data is sent in the PUSCH in the multi-TRP-based communication according to the beam mapping scheme determined in the previous steps and the data scheduling information.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 6:
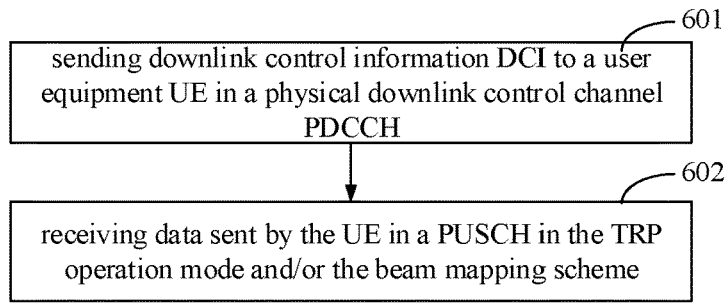
FIG. 6 is a schematic flowchart of a data communication method provided in embodiments of the present disclosure.

FIG. 6 is a schematic flowchart of a data communication method provided in embodiments of the present disclosure, which is executed by a base station.

As shown in FIG. 6, the method may include the following steps.

In step 601, downlink control information DCI is sent to a user equipment UE in a physical downlink control channel PDCCH.

The DCI carries indication information of a TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units.

In some embodiments, the base station performs scheduling according to a channel state CSI measurement value to determine at least one of the TRP operation mode or the beam mapping scheme adopted in a PUSCH. The base station may also determine at least one of the TRP operation mode and the beam mapping scheme adopted in the PUSCH based on beam management. Since a retransmission mechanism adopted by the UE has a certain correlation with the TRP operation mode and the beam mapping scheme, optimal allocation of resources is realized through the scheduling of the TRP operation mode and/or the beam mapping scheme by the base station, thereby improving the communication quality.

In some embodiments, the beam mapping scheme includes a mapping pattern and a time unit. The mapping pattern between beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;
2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;
3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;
4) Bit mapping, in which a mapping pattern between a beam corresponding to each TRP and the time unit is indicated through a Bitmap.

In some embodiments, for the aforementioned time unit, alternative solutions may be one of, but not limited to, the following cases:

1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In step 602, data sent by the UE in a PUSCH in the TRP operation mode and/or the beam mapping scheme is received.

After scheduling the UE, the base station correspondingly receives the data sent by the UE in the PUSCH based on the TRP operation mode and/or the beam mapping scheme.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 7:
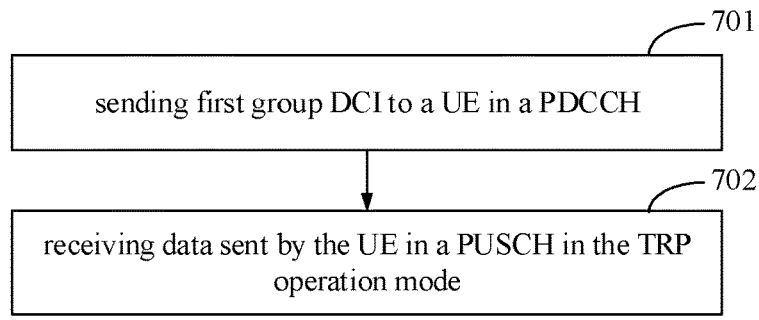
FIG. 7 is a schematic flowchart of a data communication method provided in embodiments of the present disclosure.

FIG. 7 is a schematic flowchart of another data communication method provided in embodiments of the present disclosure, which is executed by a base station.

As shown in FIG. 7, the method includes the following steps.

In step 701, first group DCI is sent to a UE in a PDCCH.

The first group DCI carries indication information of a TRP operation mode. The TRP operation mode is a single-TRP-based communication or a multi-TRP-based communication.

The first group DCI is group DCI that is generated by the base station after determining a TRP operation mode suitable for the UE from the single-TRP-based communication and the multi-TRP-based communication based on beam management or by scheduling the TRP operation mode according to a CSI measurement value obtained by channel quality measurement on an uplink/downlink channel state, and carries the indication information of the TRP operation mode.

The first group is a group of UEs to which the base station sends the first group DCI, and includes the UE executing embodiments of the present disclosure. The UE has received configuration information sent by the base station through a higher-layer signaling in advance, so that the UE has learned an information bit position corresponding to the UE in the first group DCI, and has learned an RNTI for descrambling. After receiving the first group DCI, the UE descrambles the first group DCI according to the RNTI, and reads the information bit position corresponding to itself, so as to obtain the TRP operation mode corresponding to the UE.

In step 702, data sent by the UE in a PUSCH in the TRP operation mode is received.

After scheduling the UE, the base station correspondingly receives the data sent by the UE in the PUSCH based on the TRP operation mode.

It should be noted that, in the case where the TRP operation mode is the multi-TRP-based communication, the beam mapping scheme adopted by the UE may be pre-configured by the base station to the UE through a higher-layer signaling, such as an RRC signaling. In some embodiments, the beam mapping scheme includes a mapping pattern and a time unit. The mapping pattern between beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;
2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;
3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;
4) Bit mapping, in which a mapping pattern between a beam corresponding to each TRP and the time unit is indicated through a Bitmap.

In some embodiments, for the aforementioned time unit, alternative solutions may be one of, but not limited to, the following cases:

1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 8:
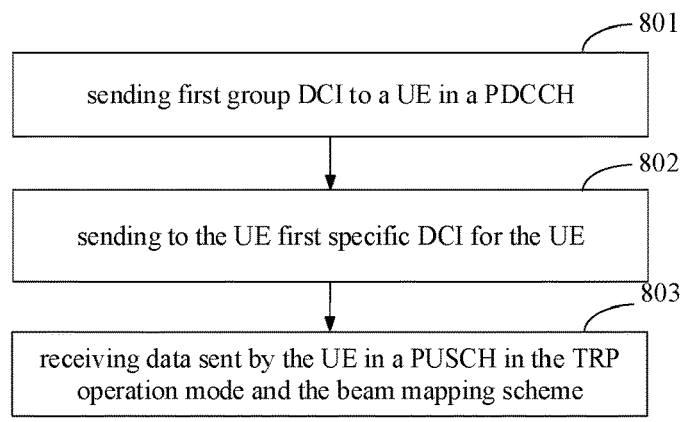
FIG. 8 is a schematic flowchart of a data communication method provided in embodiments of the present disclosure.

FIG. 8 is a schematic flowchart of another data communication method provided in embodiments of the present disclosure, which is executed by a base station.

As shown in FIG. 8, the method may include the following steps.

In step 801, first group DCI is sent to a UE in a PDCCH.

The first group DCI carries indication information of a TRP operation mode. The TRP operation mode is a single-TRP-based communication or a multi-TRP-based communication.

The first group DCI is group DCI that is generated by the base station after determining a TRP operation mode suitable for the UE from the single-TRP-based communication and the multi-TRP-based communication based on beam management or by scheduling the TRP operation mode according to a CSI measurement value obtained by channel quality measurement on an uplink/downlink channel state, and carries the indication information of the TRP operation mode.

The first group is a group of UEs to which the base station sends the first group DCI, and includes the UE executing embodiments of the present disclosure. The UE has received configuration information sent by the base station through a higher-layer signaling in advance, so that the UE has learned an information bit position corresponding to the UE in the first group DCI, and has learned an RNTI for descrambling. After receiving the first group DCI, the UE descrambles the first group DCI according to the RNTI, and reads the information bit position corresponding to itself, so as to obtain the TRP operation mode corresponding to the UE.

In step 802, first specific DCI for the UE is sent to the UE.

The first specific DCI is configured to be decoded using a decoding strategy corresponding to the TRP operation mode in the first group DCI and carries the indication information of the beam mapping scheme.

The first specific DCI is sent by the base station for the UE and is configured to dynamically configure the UE. The first specific DCI carries data scheduling information, and the data scheduling information includes data sending information based on codebook transmission or data sending information based on non-codebook transmission. In a case where the TRP operation mode is the multi-TRP-based communication, the first specific DCI further includes indication information of the beam mapping scheme.

In some embodiments, the beam mapping scheme includes a mapping pattern and a time unit. The mapping pattern between beams corresponding to the multi-TRP-based communication and the time units may be one of, but not limited to, the following cases:

1) Periodic mapping, in which beams (marked as TCI 1 and TCI 2 by using beam directions to represent TCI states) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;
2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;
3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;
4) Bit mapping, in which a mapping pattern between a beam corresponding to each TRP and the time unit is indicated through a Bitmap.

In some embodiments, for the aforementioned time unit, alternative solutions may be one of, but not limited to, the following cases:
1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In order to enable the UE to obtain the corresponding beam mapping scheme based on the indication information, in embodiments of the present disclosure, the base station can configure the beam mapping scheme corresponding to the indication information to the UE in advance through a higher-layer signaling, such as an RRC signaling.

In some embodiments, the indication information of the beam mapping scheme may be an identifier occupying several bits, corresponding to the mapping pattern, the time unit, or the combination of the mapping pattern and the time unit in the beam mapping scheme. Specifically, for determining the mapping scheme based on the identifier, there are at least the following possible implementations.

As a first possible implementation, the base station sends one of the mapping pattern and the time unit in advance through a higher-layer signaling, such as an RRC signaling, so that the UE has preconfigured the mapping pattern or the time unit. The base station also sends to or predefines for the UE a correspondence between the identifier and the other one of the mapping pattern and the time unit through the higher-layer signaling, so that the UE can determine the corresponding mapping pattern or time unit according to the identifier in the first specific DCI.

For example, the base station configures the mapping pattern through an RRC signaling, and configures the correspondence between the identifier and the time unit through the RRC signaling or other higher-layer signaling. After receiving the first specific DIC, the UE determines the corresponding time unit through the identifier in the first specific DCI.

For another example, the base station configures the time unit through an RRC signaling, and configures the correspondence between the identifier and the mapping pattern through the RRC signaling or other higher-layer signaling. After receiving the first specific DIC, the UE determines the corresponding mapping pattern through the identifier in the first specific DCI.

As a second possible implementation, the base station sends the correspondence between the identifier and the beam mapping scheme in advance through a higher-layer signaling, such as an RRC signaling, or the UE predefines the correspondence between the identifier and the beam mapping scheme. The beam mapping scheme is a combination of the mapping pattern and the time unit, so that the UE can determine a corresponding combination of the mapping pattern and the time unit according to the identifier in the first specific DCI.

As a third possible implementation, the base station configures the beam mapping scheme for the UE in advance through a higher-layer signaling, or pre-defines the beam mapping scheme for the UE, including a possible mapping pattern between beams corresponding to the multi-TRP-based communication and time units and/or a possible time unit. Based on the identifier carried in the first specific DCI, it is determined whether to adopt the mapping pattern and/or the time unit.

In step 803, data sent by the UE in a PUSCH in the TRP operation mode and the beam mapping scheme is received.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 9:
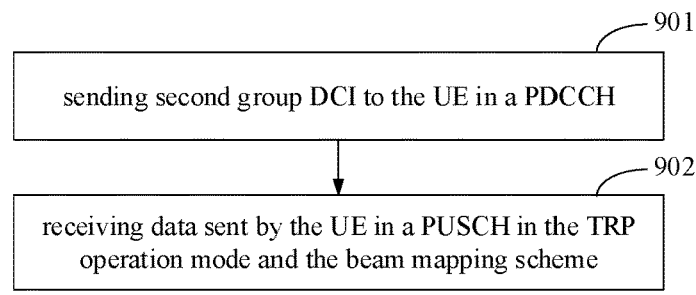
FIG. 9 is a schematic flowchart of a data communication method provided in embodiments of the present disclosure.

FIG. 9 is a schematic flowchart of another data communication method provided in embodiments of the present disclosure, which is executed by a base station.

As shown in FIG. 9, the method includes the following steps.

In step 901, second group DCI is sent to the UE in a PDCCH.

The second group DCI carries indication information of a beam mapping scheme, and the indication information of the beam mapping scheme has a correspondence with the TRP operation mode.

The second group DCI is group DCI that is generated by the base station after determining a beam mapping scheme suitable for the UE from a plurality of candidate beam mapping schemes based on beam management or by scheduling the beam mapping schemes according to a CSI measurement value obtained by channel quality measurement on an uplink/downlink channel state, and carries the indication information of the beam mapping scheme of the UE.

The second group DCI is sent by the base station to a group of UEs, including the UE executing embodiments of the present disclosure. The UE has received configuration information sent by the base station through a higher-layer signaling in advance, so that the UE has learned an information bit position corresponding to the UE in the second group DCI, and has learned an RNTI for descrambling. After receiving the second group DCI, the UE descrambles the second group DCI according to the RNTI, and reads the information bit position corresponding to itself, so as to obtain the beam mapping scheme corresponding to the UE.

In some embodiments, the beam mapping scheme includes a mapping pattern and a time unit. The mapping pattern between beams corresponding to the multi-TRPbased communication and the time units may be one of, but not limited to, the following cases:
1) Periodic mapping, in which beams (marked as TCI 1 and TCI 2 by using beam directions to represent TCI states) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;
2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;
3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;
4) Bit mapping, in which a mapping pattern between a beam corresponding to each TRP and the time unit is indicated through a Bitmap.

In some embodiments, for the aforementioned time unit, alternative solutions may be one of, but not limited to, the following cases:
1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In some embodiments, the indication information of the beam mapping scheme may be an identifier occupying several bits, corresponding to the mapping pattern, the time unit, or the combination of the mapping pattern and the time unit in the beam mapping scheme. The base station at least has the following possible implementations to configure the mapping scheme for the UE.

As a first possible implementation, the base station has pre-configured one of the mapping pattern and the time unit for the UE through a higher-layer signaling, such as an RRC signaling. During scheduling, the base station sends a correspondence between the identifier and the other one of the mapping pattern and the time unit through the higher-layer signaling, so that the UE can determine the corresponding mapping pattern or time unit according to the identifier in the second group DCI.

For example, the base station configures the mapping pattern through an RRC signaling, and configures a correspondence between the identifier and the time unit as well as the TRP operation mode through the RRC signaling or other higher-layer signaling. In this way, after receiving the second group DCI, the UE determines the corresponding time unit and TRP operation mode through the identifier in the second group DCI.

For another example, the base station configures the time unit through an RRC signaling, and configures a correspondence between the identifier and the mapping pattern as well as the TRP operation mode through the RRC signaling or other higher-layer signaling. In this way, after receiving the second group DCI, the UE determines the corresponding mapping pattern and TRP operation mode through the identifier in the second group DCI.

As a second possible implementation, the base station sends a correspondence between the identifier and the beam mapping scheme in advance through a higher-layer signaling, such as an RRC signaling. The beam mapping scheme is a combination of the mapping pattern and the time unit, so that the UE can determine a corresponding combination of the mapping pattern and the time unit according to the identifier in the second group DCI.

As a third possible implementation, the base station sends the beam mapping scheme in advance through a higher-layer signaling, including a possible mapping pattern between beams corresponding to the multi-TRP-based communication and time units and/or a possible time unit. Based on the identifier carried in the second group DCI, it is determined whether to adopt the mapping pattern and/or the time unit.

In step 902, data sent by the UE in a PUSCH in the TRP operation mode and the beam mapping scheme is received.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Figure 10:
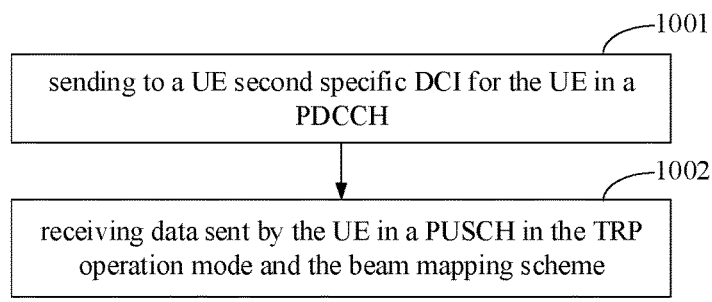
FIG. 10 is a schematic flowchart of a data communication method provided in embodiments of the present disclosure.

FIG. 10 is a schematic flowchart of another data communication method provided in embodiments of the present disclosure, which is executed by a base station.

As shown in FIG. 10, the method may include the following steps.

In step 1001, second specific DCI for a UE is sent to the UE in a PDCCH.

The second specific DCI carries indication information of a beam mapping scheme and/or indication information of a TRP operation mode.

The second specific DCI is specific DCI for the UE that is generated by the base station after determining a beam mapping scheme and/or a TRP operation mode suitable for the UE from a plurality of candidate beam mapping schemes based on beam management or by scheduling the beam mapping schemes according to a CSI measurement value obtained by channel quality measurement on an uplink/ downlink channel state, and carries the indication information of the beam mapping scheme and/or the indication information of the TRP operation mode of the UE.

In some embodiments, the beam mapping scheme includes a mapping pattern and a time unit. A mapping pattern between beams corresponding to a multi-TRP-based communication and time units may be one of, but not limited to, the following cases:

1) Periodic mapping, in which beams (communication configuration indication (TCI) states being marked as TCI 1 and TCI 2 using representations of beam directions) corresponding to two TCIs are sequentially and cyclically mapped to multiple time units configured, for example, in the case of 4 time units, TCI 1 and TCI 2 are cyclically mapped to the 4 time units, that is, the mapping sequence is TCI 1, TCI 2, TCI 1 and TCI 2;
2) Continuous mapping, in which the beams TCI 1 and TCI 2 corresponding to the two TCIs are continuously and cyclically mapped to multiple time units configured. For example, in the case of 4 time units, TCI 1 and TCI 2 are repeated several times, respectively, and once one of them reaches a certain number of repetitions, the other one is switched for mapping. For example, in the case of 4 time units, the mapping sequence is TCI 1, TCI 1, TCI 2, and TCI 2. For another example, in the case of 8 time units, the mapping sequence is TCI 1, TCI 1, TCI 2, TCI 2, TCI 1, TCI 1, TCI 2 and TCI 2;
3) Half-half mapping, in which one of the beams TCI 1 and TCI 2 corresponding to the two TCIs is mapped to a first half of multiple time units, and the other one of the beams TCI 1 and TCI 2 is mapped to a second half of the multiple time units, for example, in the case of 8 time units, the mapping sequence is TCI 1, TCI 1, TCI 1, TCI 1, TCI 2, TCI 2, TCI 2, and TCI 2;
4) Bit mapping, in which a mapping pattern between a beam corresponding to each TRP and the time unit is indicated through a Bitmap.

In some embodiments, for the aforementioned time unit, alternative solutions may be one of, but not limited to, the following cases:

1) nominal communication timing (nominal repetition);
2) actual communication timing (actual repetition);
3) slot-level mapping (slot-level).

It should be noted that, in the above description, two TRPs are usually used as an example of the multi-TRP-based communication, this is because currently in the related art of multi-TRP-based communication and cooperation, the maximum number of TRPs is limited to two. However, embodiments of the present disclosure may be applied to communication based on more TRPs, which is not limited herein.

In some embodiments, the indication information of the beam mapping scheme may be an identifier occupying several bits, corresponding to the mapping pattern, the time unit, or the combination of the mapping pattern and the time unit in the beam mapping scheme. The base station at least has the following possible implementations to configure the mapping scheme for the UE.

As a first possible implementation, the base station sends one of the mapping pattern and the time unit in advance through a higher-layer signaling, such as an RRC signaling, so that the UE has preconfigured the mapping pattern or the time unit. The base station also sends to or predefines for the UE a correspondence between the identifier and the other one of the mapping pattern and the time unit through the higher-layer signaling, so that the UE can determine the corresponding mapping pattern or time unit according to the identifier in the second specific DCI.

For example, the base station configures the mapping pattern through an RRC signaling, and configures the correspondence between the identifier and the time unit through the RRC signaling or other higher-layer signaling. After receiving the second specific DCI, the UE determines the corresponding time unit through the identifier in the second specific DCI.

It should be noted that, the identifier may have a specific value to indicate that the base station has not selected a time unit for the case of the single-TRP-based communication mode.

For another example, the base station configures the time unit through an RRC signaling, and configures the correspondence between the identifier and the mapping pattern through the RRC signaling or other higher-layer signaling. After receiving the second specific DCI, the UE determines the corresponding mapping pattern through the identifier in the second specific DCI.

As a second possible implementation, the base station sends the correspondence between the identifier and the beam mapping scheme in advance through a higher-layer signaling, such as an RRC signaling, or the UE predefines the correspondence between the identifier and the beam mapping scheme. The beam mapping scheme is a combination of the mapping pattern and the time unit, so that the UE can determine a corresponding combination of the mapping pattern and the time unit according to the identifier in the second specific DCI.

It should be noted that, the identifier may have a specific value to indicate that the base station has not selected a beam mapping scheme, i.e., a combination of the mapping pattern and the time unit, for the case of the single-TRP-based communication mode.

As a third possible implementation, the base station sends the beam mapping scheme in advance through a higher-layer signaling, or pre-defines the beam mapping scheme for the UE, including a possible mapping pattern between beams corresponding to the multi-TRP-based communication and time units and/or a possible time unit. Based on the identifier carried in the second specific DCI, it is determined whether to adopt the mapping pattern and/or the time unit.

In step 1002, data sent by the UE in a PUSCH in the TRP operation mode and the beam mapping scheme is received.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Corresponding to the data communication methods provided in the aforementioned embodiments, the present disclosure also provides a data communication apparatus. Due to the correspondence between the data communication apparatus provided in embodiments of the present disclosure and the data communication methods provided in the aforementioned embodiments, the implementations of the data communication method are also applicable to the data communication apparatus provided in embodiments of the present disclosure, which will not be described in detail here. FIG. 11-FIG. 16 are schematic block diagrams of a data communication apparatus provided by the present disclosure.

Figure 11:
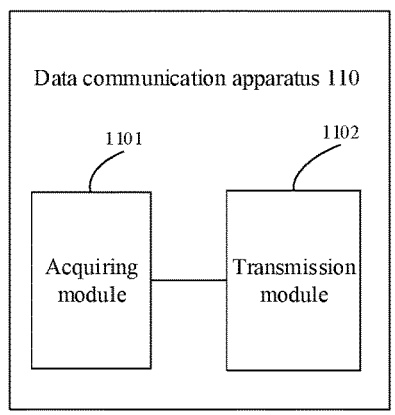
FIG. 11 is a schematic block diagram of a data communication apparatus provided by the present disclosure.

FIG. 11 is a schematic block diagram of a data communication apparatus provided in embodiments of the present disclosure. The apparatus is applied to a user equipment UE.

As shown in FIG. 11, the data communication apparatus 110 includes: an acquiring module 1101 and a transmission module 1102.

The acquiring module 1101 is configured to acquire a control signaling sent by a base station. The control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units.

The transmission module 1102 is configured to send an uplink transmission to the base station in the TRP operation mode and/or the beam mapping scheme.

Figure 12:
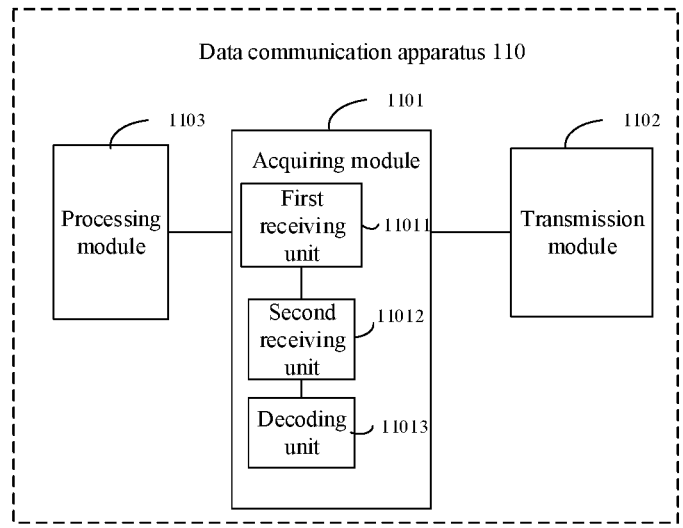
FIG. 12 is a schematic block diagram of a data communication apparatus provided by the present disclosure.

In embodiments of the present disclosure, as shown in FIG. 12, the acquiring module 1101 includes a first receiving unit 11011, and the first receiving unit 11011 is configured to receive a first group message sent by the base station in a downlink channel. The first group message carries the indication information of the TRP operation mode.

In some embodiments of the present disclosure, the message may be downlink control information (DCI) or other signaling transmitted in a PDCCH, or may be a signaling transmitted in a PDSCH. The specific form of the message is not limited in embodiments of the present disclosure. That is, in some embodiments of the present disclosure, the first group message may be, for example, first group DCI.

In some embodiments, the downlink channel may be a physical downlink control channel PDCCH or a physical downlink shared channel PDSCH. Preferably, the downlink channel may be a PDCCH.

In embodiments of the present disclosure, the acquiring module 1101 further includes a second receiving unit 11012 and a decoding unit 11013. The second receiving unit 11012 is configured to receive a first specific message (such as first specific DCI) for the UE sent by the base station in the downlink channel (such as the PDCCH or the PDSCH); and the decoding unit 11013 is configured to decode the first specific message (such as the first specific DCI) according to a decoding strategy corresponding to the TRP operation mode in the first group message (such as the first group DCI) to obtain the indication information of the beam mapping scheme.

In an embodiment of the present disclosure, the apparatus further includes a processing module 1103, and the processing module 1103 is configured to: configure a beam mapping scheme corresponding to the indication information according to a higher-layer signaling sent by the base station; or predefine a beam mapping scheme corresponding to the indication information for the UE.

Figure 13:
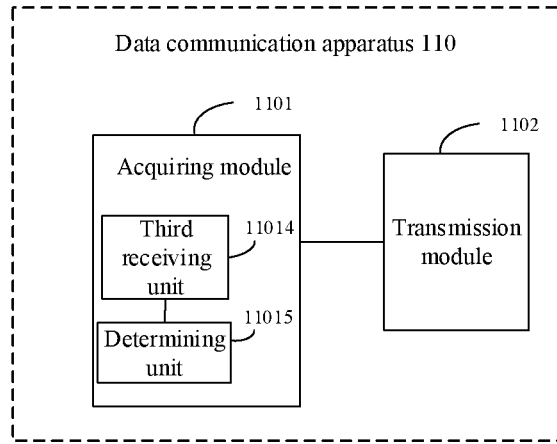
FIG. 13 is a schematic block diagram of a data communication apparatus provided by the present disclosure.

In embodiments of the present disclosure, as shown in FIG. 13, the acquiring module 1101 includes a third receiving unit 11014 and a determining unit 11015. The third receiving unit 11014 is configured to receive a second group message (such as second group DCI) sent by the base station in a downlink channel (such as a PDCCH or a PDSCH), and the second group message carries the indication information of the beam mapping scheme; and the determining unit 11015 is configured to determine a corresponding TRP operation mode according to the indication information of the beam mapping scheme carried in the second group message.

Figure 14:
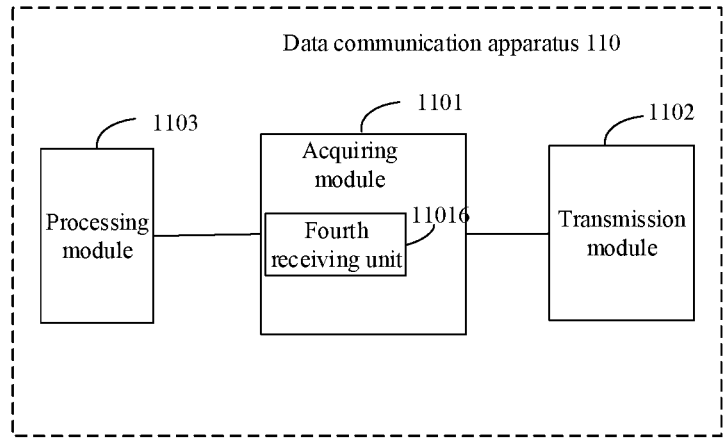
FIG. 14 is a schematic block diagram of a data communication apparatus provided by the present disclosure.

In embodiments of the present disclosure, as shown in FIG. 14, the acquiring module 1101 includes a fourth receiving unit 11016, and the fourth receiving unit 11016 is configured to receive a second specific message (such as second specific DCI) for the UE sent by the base station in a downlink channel (such as a PDCCH or a PDSCH). The second specific message carries the indication information of the beam mapping scheme and/or the indication information of the TRP operation mode.

In embodiments of the present disclosure, the second specific message carries the indication information of the TRP operation mode, and the processing module 1103 is configured to: configure a beam mapping scheme corresponding to the indication information according to a higher-layer signaling sent by the base station; or predefine a beam mapping scheme corresponding to the indication information for the UE.

Figure 15:
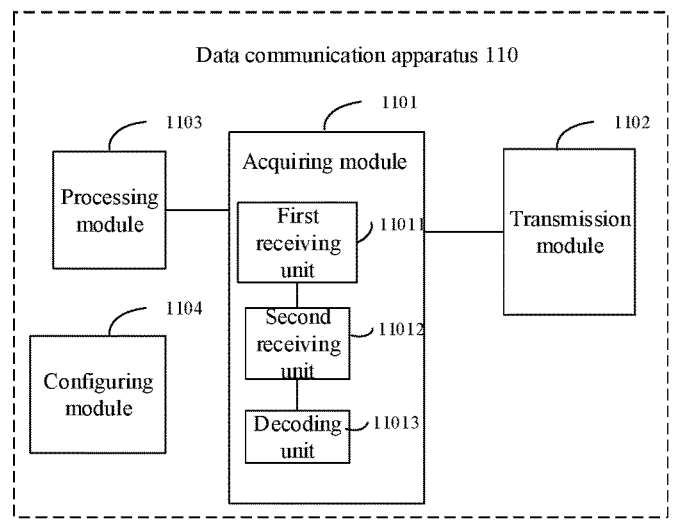
FIG. 15 is a schematic block diagram of a data communication apparatus provided by the present disclosure.

In embodiments of the present disclosure, the indication information of the beam mapping scheme carried in the control signaling indicates a combination of the mapping pattern and the time unit selected by the base station, or indicates that the base station has not selected a beam mapping scheme. In embodiments of the present disclosure, as shown in FIG. 15, further, in a possible implementation of embodiments of the present disclosure, the indication information of the beam mapping scheme carried in the control signaling indicates one of the mapping pattern and the time unit, and the apparatus further includes a configuring module 1104 configured to configure the other one of the mapping pattern and the time unit according to a higher-layer signaling sent by the base station.

Figure 16:
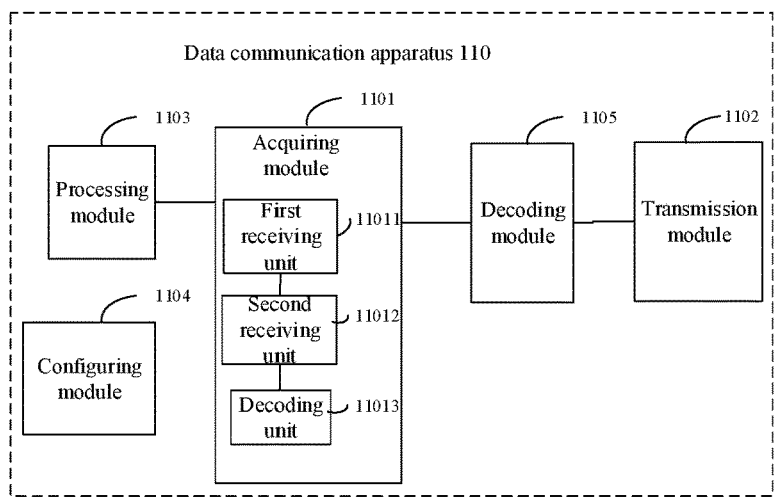
FIG. 16 is a schematic block diagram of a data communication apparatus provided by the present disclosure.

In embodiments of the present disclosure, as shown in FIG. 16, the apparatus further includes a decoding module 1105, and the decoding module 1105 is configured to decode specific DCI for the UE sent by the base station using a decoding strategy corresponding to the TRP operation mode to obtain data scheduling information used by a physical uplink shared channel PUSCH. The PUSCH is used to send the data to the base station, and the data scheduling information includes data sending information based on codebook transmission or data sending information based on non-codebook transmission.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

Corresponding to the data communication methods provided in the aforementioned embodiments, the present disclosure also provides a data communication apparatus. Due to the correspondence between the data communication apparatus provided in embodiments of the present disclosure and the data communication methods provided in the aforementioned embodiments, the implementations of the data communication method are also applicable to the data communication apparatus provided in embodiments of the present disclosure, which will not be described in detail here. FIG. 17-FIG. 22 are schematic block diagrams of a data communication apparatus provided by the present disclosure.

Figure 17:
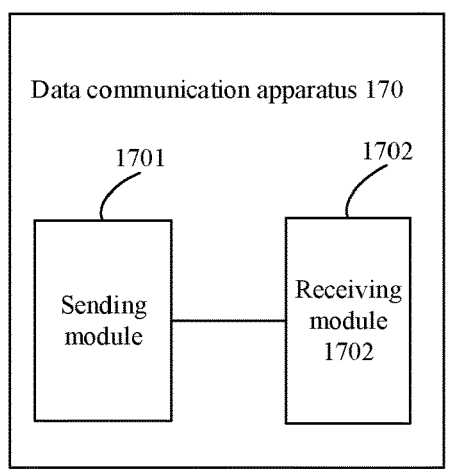
FIG. 17 is a schematic block diagram of a data communication apparatus provided by the present disclosure.

FIG. 17 is a schematic block diagram of a data communication apparatus provided in embodiment of the present disclosure. The apparatus is applied to a base station.

As shown in FIG. 17, the data communication apparatus 170 includes: a sending module 1701 and a receiving module 1702.

The sending module 1701 is configured to send a control signaling to a user equipment UE. The control signaling carries indication information of a transmission and reception point TRP operation mode and/or a beam mapping scheme, the TRP operation mode is a single-TRP-based communication or a multi-TRP-based communication, and the beam mapping scheme includes information of a time unit and/or information of a mapping pattern between multiple uplink cooperative transmitting beams corresponding to multiple TRPs and time units.

The receiving module 1702 is configured to receive data sent by the UE in the TRP operation mode and/or the beam mapping scheme.

Figure 18:
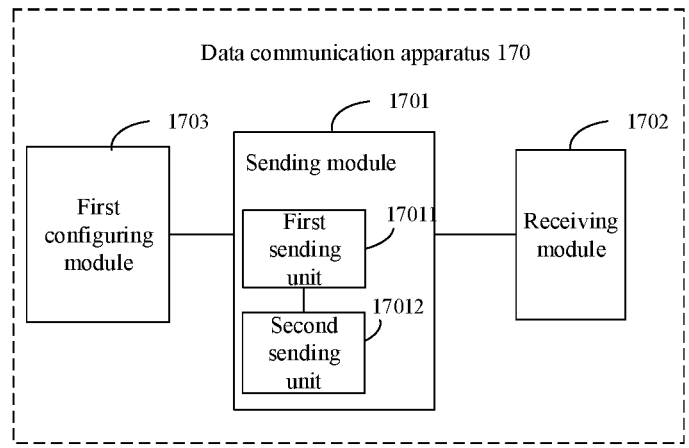
FIG. 18 is a schematic block diagram of a data communication apparatus provided by the present disclosure.

In embodiments of the present disclosure, as shown in FIG. 18, the sending module 1701 includes a first sending unit 17011, and the first sending unit 17011 is configured to send first group downlink control information DCI to the UE in a physical downlink control channel PDCCH. The first group DCI carries the indication information of the TRP operation mode.

In embodiments of the present disclosure, the sending module 1701 further includes a second sending unit 17012, and the second sending unit 17012 is configured to send to the UE first specific DCI for the UE. The first specific DCI is configured to be decoded using a decoding strategy corresponding to the TRP operation mode in the first group DCI and carries the indication information of the beam mapping scheme.

In embodiments of the present disclosure, the apparatus further includes a first configuring module 1703, and the first configuring module 1703 is configured to send to the UE a higher-layer signaling for configuring a beam mapping scheme corresponding to the indication information.

Figure 19:
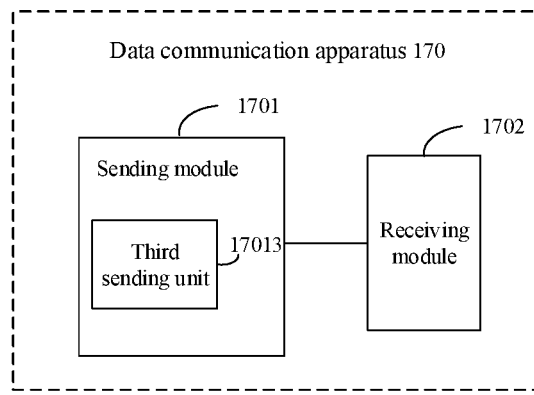
FIG. 19 is a schematic block diagram of a data communication apparatus provided by the present disclosure.

In embodiments of the present disclosure, as shown in FIG. 19, the sending module 1701 includes a third sending unit 17013, and the third sending unit 17013 is configured to send second group DCI to the UE in a PDCCH. The second group DCI carries the indication information of the beam mapping scheme, and the indication information of the beam mapping scheme corresponds to the TRP operation mode.

Figure 20:
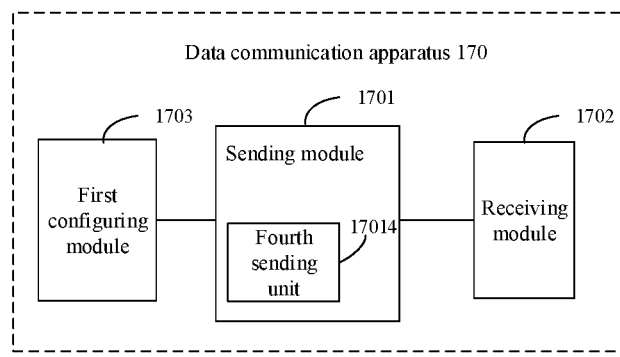
FIG. 20 is a schematic block diagram of a data communication apparatus provided by the present disclosure.

In embodiments of the present disclosure, as shown in FIG. 20, the sending module 1701 includes a fourth sending unit 17014, and the fourth sending unit 17014 is configured to send to the UE second specific DCI for the UE in a PDCCH. The second specific DCI carries the indication information of the beam mapping scheme and/or the indication information of the TRP operation mode.

In embodiments of the present disclosure, the second specific DCI carries the indication information of the TRP operation mode, and the first configuring module 1703 is configured to send to the UE a higher-layer signaling for configuring a beam mapping scheme corresponding to the indication information.

In embodiments of the present disclosure, the indication information of the beam mapping scheme carried in the control signaling indicates a combination of the mapping pattern and the time unit selected by the base station, or indicates that the base station has not selected a beam mapping scheme.

Figure 21:
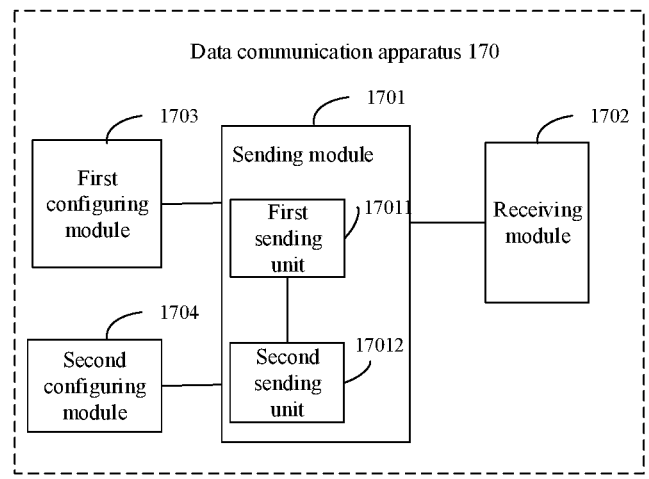
FIG. 21 is a schematic block diagram of a data communication apparatus provided by the present disclosure.

In embodiments of the present disclosure, as shown in FIG. 21, the indication information of the beam mapping scheme carried in the control signaling indicates one of the mapping pattern and the time unit. The apparatus further includes a second configuring module 1704, and the second configuring module 1704 is configured to send to the UE a higher-layer signaling for configuring the other one of the mapping pattern and the time unit.

Figure 22:
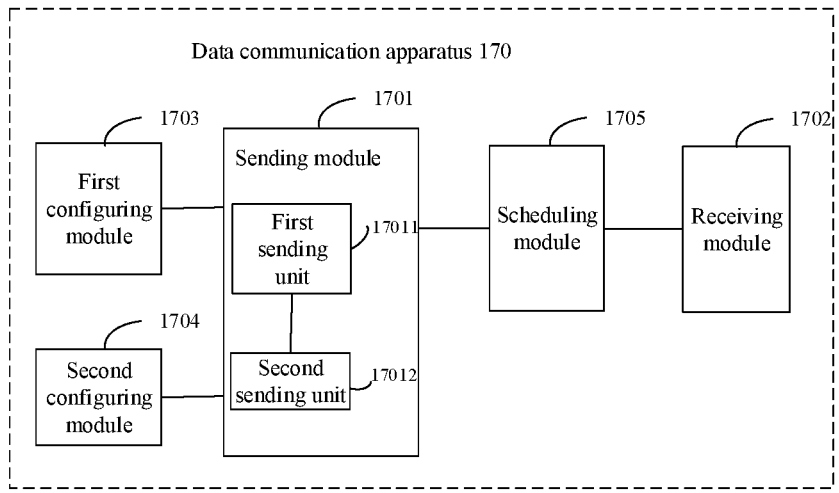
FIG. 22 is a schematic block diagram of a data communication apparatus provided by the present disclosure.

In embodiments of the present disclosure, as shown in FIG. 22, the apparatus further includes a scheduling module 1705, and the scheduling module 1705 is configured to: schedule according to a channel state CSI measurement value to determine at least one of the TRP operation mode or the beam mapping scheme; and/or perform beam management to determine at least one of the TRP operation mode or the beam mapping scheme.

In embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

According to embodiments of the present disclosure, the present disclosure further provides a communication device and a readable storage medium.

Figure 23:
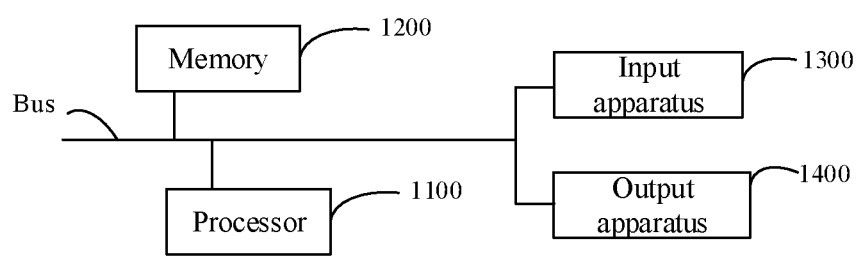
FIG. 23 is a schematic block diagram of a communication device provided by the present disclosure.

FIG. 23 is a block diagram of a data communication device for a physical uplink shared channel according to embodiments of the present disclosure. As shown in FIG. 23, the communication device is intended to represent various forms of digital computers, such as a laptop computer, a desktop computer, a workstation, a personal digital assistant, a server, a blade server, a mainframe computer, and other suitable computers. The communication device may also represent various forms of mobile devices, such as a personal digital processor, a cellular phone, a smart phone, a wearable device, and other similar computing devices. Components shown herein, their connections and relationships, and their functions are only used for illustrations, and are not intended to limit implementations of the present disclosure described and/or claimed herein.

As shown in FIG. 23, the communication device includes: one or more processors 1100, a memory 1200, and interfaces for connecting various components, including a high-speed interface and a low-speed interface. The various components are interconnected using different buses, and may be mounted on a common mainboard or otherwise as desired. The processor may process instructions executed within the communication device, including instructions stored in or on the memory to display graphical information of a graphical user interface (GUI) on an external input/output device, such as a display device coupled to the interface. In other embodiments, multiple processors and/or multiple buses may be used with multiple memories, if desired. Likewise, multiple communication devices may be connected, with each device providing some of the necessary operations (e.g., as a server array, a group of blade servers, or a multi-processor system). In FIG. 23, as an example, a processor 1100 is provided.

The memory 1200 is the non-transitory computer-readable storage medium provided in the present disclosure. The memory has stored therein instructions that are executable by at least one processor to cause the at least one processor to execute the data communication method provided in the present disclosure. The non-transitory computer-readable storage medium of the present disclosure has stored therein computer instructions, and the computer instructions are configured to cause a computer to execute the data communication method provided in the present disclosure.

As a non-transitory computer-readable storage medium, the memory 1200 can be used to store non-transitory software programs, non-transitory computer-executable programs and modules, for example, program instructions/modules corresponding to the data communication method in embodiments of the present disclosure, such as the acquiring module 1101 and the transmission module 1102 shown in FIG. 11, or the sending module 1701 and the receiving module 1702 shown in FIG. 17. The processor 1100 executes various functional applications and data processing of the server, i.e., implements the data communication method in the above method embodiments, by running the non-transitory software programs, instructions and modules stored in the memory 1200.

The memory 1200 may include a storage program area and a storage data area, the storage program area may store an operating system, and an application program required for at least one function; and the storage data area may store data created according to the use of a positioning communication device, and the like. Additionally, the memory 1200 may include a high-speed random access memory, and may also include a non-transitory memory, such as at least one magnetic disk storage device, flash memory device, or other non-transitory solid-state storage device. In some embodiments, the memory 1200 may In some embodiments include memories located remotely from the processor 1100, and these remote memories may be connected to the positioning communication device through a network. Examples of the above-mentioned network include, but is not limited to, the Internet, an intranet, a local area network, a mobile communication network, and a combination thereof.

The communication device for the data communication of the physical uplink shared channel may further include: an input apparatus 1300 and an output apparatus 1400. The processor 1100, the memory 1200, the input apparatus 1300, and the output apparatus 1400 may be connected by a bus or in other ways, such as connected by a bus as shown in FIG. 22 as an example.

The input apparatus 1300 can receive numerical or character information input and generate key signal input related to user settings and functional control of the positioning communication device, such as a touch screen, a keypad, a mouse, a trackpad, touchpad, a pointing stick, one or more mouse buttons, trackballs, joysticks, and other input apparatus. The output apparatus 1400 may include a display device, an auxiliary lighting device (e.g., a LED), a haptic feedback device (e.g., a vibration motor), and the like. The display device may include, but is not limited to, a liquid crystal display (LCD), a light emitting diode (LED) display, and a plasma display. In some embodiments, the display device may be a touch screen.

Various embodiments of the systems and techniques described herein may be implemented in a digital electronic circuit system, an integrated circuit system, an application-specific integrated circuit (ASIC), a computer hardware, a firmware, a software, and/or a combination thereof. These various embodiments may include: being implemented in one or more computer programs executable and/or interpretable on a programmable system including at least one programmable processor. The programmable processor may be a specific or generic programmable processor that may receive data and instructions from a storage system, at least one input apparatus, and at least one output apparatus, and transmit data and instructions to the storage system, the at least one input apparatus, and the at least one output apparatus.

These computational programs (also referred to as programs, software, software applications, or codes) include machine instructions for programmable processors, and may be implemented using high-level procedural and/or object-oriented programming languages, and/or assembly/machine languages. As used herein, the terms "machine-readable medium" and "computer-readable medium" refer to any computer program product, device, and/or apparatus (such as, a magnetic disk, an optical disk, a memory, a programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and techniques described herein may be implemented on a computer that includes: a display apparatus (e.g., a cathode-ray tube (CRT) or a liquid crystal display (LCD) monitor) for displaying information to a user; and a keyboard and a pointing apparatus (e.g., a mouse or a trackball) through which the user can provide an input to the computer. Other kinds of apparatuses can also be used to provide interaction with the user; for example, a feedback provided to the user can be any form of sensory feedback (e.g., a visual feedback, an auditory feedback, or a tactile feedback); and the input from the user may be received in any form (including acoustic input, voice input, or tactile input).

The systems and techniques described herein can be implemented in a computing system including a back-end component (e.g., as a data server), a computing system including a middleware component (e.g., an application server), a computing system including a front-end component (e.g., a user computer having a graphical user interface or a web browser through which a user may interact with implementations of the systems and techniques described herein), or a computing system that includes any combination of the back-end component, the middleware component, or the front-end component. The components of the system may be connected with each other by any form or medium of digital data communication (e.g., a communication network). An example of the communication network includes a local area network (LAN), a wide area network (WAN), and the Internet.

A computer system may include a client and a server. The client and the server are generally remote from each other and usually interact with each other through a communication network. A relationship of the client and the server is generated by computer programs that run on respective computers and have a client-server relationship with each other.

In the data communication apparatus according to embodiments of the present disclosure, after the base station sends the DCI to the UE in the PDCCH, since the DCI carries the indication information of the TRP operation mode and/or the beam mapping scheme, the UE sends the data in the PUSCH using the corresponding TRP operation mode and/or beam mapping scheme under the scheduling of the base station, and correspondingly, the base station receives the data sent by the UE in the PUSCH in the TRP operation mode and/or the beam mapping scheme, so that the switch of the single-TRP-based communication or the multi-TRP-based communication in the PUSCH is realized, or the scheduling of the beam mapping scheme is realized, thereby improving the data communication quality in the PUSCH.

It can be understood that various forms of flow charts shown above can be used to reorder, add, or remove steps. For example, the steps described in the present disclosure may be performed in parallel, sequentially, or in a different order. There is no limitation herein as long as the desired results of the technical solutions disclosed herein can be realized.

The above-mentioned specific embodiments do not constitute a limitation on the protection scope of the present disclosure. It can be understood by those skilled in the art that various modifications, combinations, sub-combinations and substitutions can be made depending on design requirements and other factors. Any modifications, equivalent replacements, and improvements made within the spirit and principle of the present disclosure shall be included within the protection scope of the present disclosure.

What is claimed is:

1. A data communication method, applied to a user equipment (UE) and comprising:
    acquiring a control signaling sent by a base station; wherein the control signaling carries indication information of a transmission and reception point (TRP) operation mode and a beam mapping scheme, the TRP operation mode is a single-TRP-based communication or a multi-TRP-based communication, and the beam mapping scheme indicates information of a mapping pattern between multiple uplink cooperative transmitting beams corresponding to multiple TRPs and time units; and
    sending data to the base station in the TRP operation mode and the beam mapping scheme;
    wherein acquiring the control signaling sent by the base station comprises:
    receiving a radio resource control (RRC) signaling carrying a mapping pattern configuration for determining the mapping pattern; and
    receiving a downlink control information (DCI) carrying the indication information of the TRP operation mode;
    wherein the mapping pattern comprises at least one of a cyclic mapping, a sequential mapping, a half-half mapping or a bit mapping,
    the time units are determined according to at least one of nominal repetition, actual repetition or slot-level mapping.

2. The data communication method according to claim 1, wherein acquiring the control signaling sent by the base station comprises:
    receiving first group DCI sent by the base station in a physical downlink control channel (PDCCH); wherein the first group DCI carries the indication information of the TRP operation mode,
    or
    receiving a second group DCI sent by the base station in the PDCCH, wherein the second group DCI carries the indication information of the beam mapping scheme; and determining a corresponding TRP operation mode according to the indication information of the beam mapping scheme carried in the second group DCI,
    or
    receiving second specific DCI for the UE sent by the base station in the PDCCH; wherein the second specific DCI carries the indication information of at least one of the beam mapping scheme or the indication information of the TRP operation mode.

3. The data communication method according to claim 2, further comprising:
    receiving first specific DCI for the UE sent by the base station in the PDCCH; and
    decoding the first specific DCI according to a decoding strategy corresponding to the TRP operation mode in the first group DCI to obtain the indication information of the beam mapping scheme.

4. The data communication method according to claim 3, further comprising:
    configuring a beam mapping scheme corresponding to the indication information according to a higher-layer signaling sent by the base station; or
    predefining a beam mapping scheme corresponding to the indication information for the UE.

5. The data communication method according to claim 2, wherein the second specific DCI carries the indication information of the TRP operation mode, and the method further comprises:
    configuring a beam mapping scheme corresponding to the indication information according to a higher-layer signaling sent by the base station; or
    predefining a beam mapping scheme corresponding to the indication information for the UE.

6. The data communication method according to claim 1, wherein the indication information of the beam mapping scheme carried in the control signaling indicates a combination of the mapping pattern and the time unit selected by the base station, or indicates that the base station has not selected a beam mapping scheme.

7. The data communication method according to claim 1, wherein the indication information of the beam mapping scheme carried in the control signaling indicates one of the mapping pattern and the time unit;
    wherein the method further comprises:
    configuring the other one of the mapping pattern and the time unit according to a higher-layer signaling sent by the base station.

8. The data communication method according to claim 1, further comprising:
    decoding specific DCI for the UE sent by the base station using a decoding strategy corresponding to the TRP operation mode to obtain data scheduling information used by a physical uplink shared channel (PUSCH);
    wherein the PUSCH is used for sending the data to the base station, and the data scheduling information comprises data sending information based on codebook transmission or data sending information based on non-codebook transmission.

9. A data communication method, applied to a base station and comprising:
    sending a control signaling to a user equipment (UE); wherein the control signaling carries indication information of a transmission and reception point (TRP) operation mode and a beam mapping scheme, the TRP operation mode is a single-TRP-based communication or a multi-TRP-based communication, and the beam mapping scheme indicates information of a mapping pattern between multiple uplink cooperative transmitting beams corresponding to multiple TRPs and time units; and receiving data sent by the UE in the TRP operation mode and the beam mapping scheme;

wherein sending the control signaling to the UE comprises:

sending a radio resource control (RRC) signaling carrying a mapping pattern configuration for determining the mapping pattern; and sending a downlink control information (DCI) carrying the indication information of the TRP operation mode;

wherein the mapping pattern comprises at least one of a cyclic mapping, a sequential mapping, a half-half mapping or a bit mapping, the time units are determined according to at least one of nominal repetition, actual repetition or slot-level mapping.

10. The data communication method according to claim 9, wherein sending the control signaling to the user equipment UE comprises:

sending first group DCI to the UE in a physical downlink control channel (PDCCH); wherein the first group DCI carries the indication information of the TRP operation mode, or sending a second group DCI to the UE in the PDCCH; wherein the second group DCI carries the indication information of the beam mapping scheme; and the indication information of the beam mapping scheme corresponds to the TRP operation mode, or sending to the UE second specific DCI for the UE in the PDCCH; wherein the second specific DCI carries the indication information of at least one of the beam mapping scheme or the indication information of the TRP operation mode.

11. The data communication method according to claim 10, further comprising:

sending to the UE first specific DCI for the UE;

wherein the first specific DCI is configured to be decoded using a decoding strategy corresponding to the TRP operation mode in the first group DCI and carries the indication information of the beam mapping scheme.

12. The data communication method according to claim 11, further comprising:

sending to the UE a higher-layer signaling for configuring a beam mapping scheme corresponding to the indication information.

13. The data communication method according to claim 10, wherein the second specific DCI carries the indication information of the TRP operation mode, and the method further comprises:

sending to the UE a higher-layer signaling for configuring a beam mapping scheme corresponding to the indication information.

14. The data communication method according to claim 9, wherein the indication information of the beam mapping scheme carried in the control signaling indicates a combination of the mapping pattern and the time unit selected by the base station, or indicates that the base station has not selected a beam mapping scheme.

15. The data communication method according to claim 9, wherein the indication information of the beam mapping scheme carried in the control signaling indicates one of the mapping pattern and the time unit;

wherein the method further comprises:

sending to the UE a higher-layer signaling for configuring the other one of the mapping pattern and the time unit.

16. The data communication method according to claim 9, further comprising:

scheduling according to a channel state (CSI) measurement value to determine at least one of the TRP operation mode or the beam mapping scheme; or performing beam management to determine at least one of the TRP operation mode or the beam mapping scheme.

17. A communication device, comprising:

a processor;

a transceiver;

a memory; and a computer program stored on the memory, wherein the processor is configured to run the computer program to:

acquire a control signaling sent by a base station; wherein the control signaling carries indication information of a transmission and reception point (TRP) operation mode and a beam mapping scheme, the TRP operation mode is a single-TRP-based communication or a multi-TRP-based communication, and the beam mapping scheme indicates information of a mapping pattern between multiple uplink cooperative transmitting beams corresponding to multiple TRPs and time units; and send data to the base station in the TRP operation mode and the beam mapping scheme;

wherein the processor is further configured to:

receive a radio resource control (RRC) signaling carrying a mapping pattern configuration for determining the mapping pattern; and receive a downlink control information (DCI) carrying the indication information of the TRP operation mode;

wherein the mapping pattern comprises at least one of a cyclic mapping, a sequential mapping, a half-half mapping or a bit mapping, the time units are determined according to at least one of nominal repetition, actual repetition or slot-level mapping.

18. A communication device, comprising:

a processor;

a transceiver;

a memory; and a computer program stored on the memory, wherein the processor is configured to execute the computer program to implement the data communication method according to claim 9.

19. A processor-readable storage medium having stored therein a computer program, wherein the computer program, when executed by a processor, is configured to cause the processor to implement the data communication method according to claim 1.

20. A processor-readable storage medium having stored therein a computer program, wherein the computer program, when executed by a processor, is configured to cause a processor to implement the data communication method according to claim 9.

* * * * *